US005850050A

United States Patent [19]

Isozaki et al.

[11] Patent Number: 5,850,050

[45] Date of Patent: Dec. 15, 1998

[54] METHOD AND APPARATUS FOR GENERATING MUSICAL TONES, METHOD AND APPARATUS FOR PROCESSING MUSIC DATA, METHOD AND APPARATUS REPRODUCING PROCESSED MUSIC DATA AND STORAGE MEDIA FOR PRACTICING SAME

[75] Inventors: Yoshimasa Isozaki; Motoichi Tamura; Hideo Suzuki; Masahiro Shimizu; Hideyuki Masuda, all of Hamamatsu, Japan

[73] Assignee: Yamaha Corporation, Hamamatsu, Japan

[21] Appl. No.: 921,190

[22] Filed: Aug. 29, 1997

[30] Foreign Application Priority Data

| | | | |
|---|---|---|---|
| Aug. 30, 1996 | [JP] | Japan | 8-246943 |
| Aug. 30, 1996 | [JP] | Japan | 8-249240 |

[51] Int. Cl.[6] .................. G01H 1/06; G01H 7/00

[52] U.S. Cl. .................. 84/622

[58] Field of Search .................. 84/600, 601, 622, 84/659

[56] References Cited

U.S. PATENT DOCUMENTS

| | | | |
|---|---|---|---|
| 5,020,410 | 6/1991 | Sasaki . | |
| 5,300,727 | 4/1994 | Osuga et al. | 84/622 |
| 5,363,735 | 11/1994 | Kondo | 84/622 |
| 5,376,752 | 12/1994 | Limberis et al. . | |
| 5,763,800 | 6/1998 | Rossum et al. | 84/603 |

FOREIGN PATENT DOCUMENTS

| | | |
|---|---|---|
| 0 484 043 | 5/1992 | European Pat. Off. . |
| 0 597 381 | 5/1994 | European Pat. Off. . |
| 0 715 295 | 6/1996 | European Pat. Off. . |
| 0 730 260 | 9/1996 | European Pat. Off. . |

*Primary Examiner*—William M. Shoop, Jr.
*Assistant Examiner*—Jeffrey W. Donels
*Attorney, Agent, or Firm*—Graham & James LLP

[57] ABSTRACT

Tone color data are stored in a tone generator storage region of a RAM. The tone generator data storage region is searched upon occurrence of performance information indicative of a change of tone color, to determine whether tone color data selected by the change of tone color are stored in the tone generator data storage region, and musical tone generation is controlled such that when a result of the searching indicates that the tone color data selected by the change of tone color are stored in the tone generator data storage region, a musical tone is generated based on the tone color data, and, when the tone color data selected by the change of tone color are not stored in the tone generator data storage region, the tone color data are read out from a storage medium storing the selected tone color data, and transferred to and stored in the tone generator data storage region, while generating a musical tone based on other tone color data similar to the selected tone color data.

24 Claims, 20 Drawing Sheets

METHOD AND APPARATUS FOR GENERATING MUSICAL TONES, METHOD AND APPARATUS FOR PROCESSING MUSIC DATA, METHOD AND APPARATUS REPRODUCING PROCESSED MUSIC DATA AND STORAGE MEDIA FOR PRACTICING SAME

BACKGROUND OF THE INVENTION

1. Field of the Invention

The present invention relates to a method and apparatus for generating musical tones, by controlling the tone color in response to occurrence of performance information indicative of a change of the tone color, and also relates to a method and apparatus for processing music data, a method and apparatus for reproducing processed music data, and storage media storing programs that carry out these methods.

2. Prior Art

A musical tone-generating apparatus is known wherein musical tones are generated based on performance information, such as MIDI (Musical Instrument Digital Interface) data (message).

In the known musical tone-generating apparatus, tone color data to be set in a tone generator circuit are prepared on a memory, and tone color data corresponding to generated performance information are selected from the tone color data prepared on the memory, and set in the tone generator circuit, so as to cooperate with other data, such as a note number, to produce a musical tone waveform.

With improvements in the computing (operating) capability of CPU in recent years, a so-called software tone generator has been developed wherein a program that describes a certain procedure or routine for generating musical tone is executed by a CPU installed in a general-purpose computer or an exclusive musical tone-generating apparatus, so as to produce musical tone waveform data in response to generated performance information.

In the known musical tone-generating apparatus, however, tone color data (parameters and waveform tables, for example) corresponding to all kinds of tone colors (tone color numbers) that can be produced need to be prepared on the memory in advance, so as to generate musical tones in real time in accordance with arbitrarily occurring performance information. Since the amount of the tone color data is normally considerably large, the capacity of the memory required for generation of musical tones tends to be increased.

In the software tone generator, in particular, the above tone color data need to be prepared (developed) in advance on a memory that may be accessed by the CPU (since this memory is normally a "RAM", the following explanation is limited to the case where a "RAM" is used as the memory).

In the case of a software tone generator using a waveform memory tone generator mode (PCM tone generator mode) in which musical tones generated by an actual musical instrument are modulated by PCM (pulse code modulation) and stored, and musical tones are generated by reading out the stored waveforms, for example, all of tone color data corresponding to 128 tone colors as a basic specification of GM (General MIDI) system need to be developed on the RAM, requiring a large capacity of RAM to be used since the total amount of the tone color data is about 2 megabytes (MB).

Where a general-purpose computer is used as the apparatus for executing the software tone generator program, application program(s) other than the software tone generator program may be often executed while running the software tone generator program, owing to a multi-task function of a currently available general-purpose computer, and therefore the RAM is used for both the software tone generator program and other application program(s). Accordingly, if the above-described tone color data are developed on the RAM, the capacity of the RAM that can be used by other application program(s) is reduced, with reduction in its operating speed, or the operations of such other application program(s) become unfeasible in the worst case.

SUMMARY OF THE INVENTION

It is therefore an object of the invention to provide a method and apparatus for generating musical tones, method and apparatus for processing music data, method and apparatus for reproducing processed music data, and storage media for practicing these methods, wherein the capacity of the RAM used by the software tone generator is reduced, thus assuring a sufficient capacity of RAM that can be used by other application program(s) that are concurrently executed, whereby the operations of such other application program(s) can be surely performed with high efficiency.

To attain the above object, the present invention provides a method of generating musical tones, comprising the steps of storing tone color data in tone color data storage means, searching the tone color data storage means upon occurrence of performance information indicative of a change of tone color, to determine whether tone color data selected by the change of tone color are stored in the tone color data storage means, and controlling musical tone generation such that when a result of the searching indicates that the tone color data selected by the change of tone color are stored in the tone color data storage means, a musical tone is generated based on the tone color data, and, when the tone color data selected by the change of tone color are not stored in the tone color data storage means, the tone color data are read out from a storage medium storing the selected tone color data, and transferred to and stored in the tone color data storage means, while generating a musical tone based on other tone color data similar to the selected tone color data.

Preferably, the method of generating musical tones further comprises the step of deleting tone color data that become unnecessary, out of the tone color data stored in the tone color data storage means, under a predetermined condition.

Specifically, the predetermined condition is that if any tone color has not been used until the step of deleting is executed, tone color data representing the tone color are deleted.

Alternatively, the predetermined condition is that if an amount of tone color data stored in the tone color data storage means is not smaller than a predetermined amount, tone color data that have been stored for the longest time are deleted.

To attain the above object, the present invention also provides an apparatus for generating musical tones, comprising a tone color storage device that stores tone color data, a search device that searches the tone color data storage device upon occurrence of performance information indicative of a change of tone color, to determine whether tone color data selected by the change of tone color are stored in the tone color data storage device, and a control device that controls musical tone generation such that when a result of the searching indicates that the tone color data selected by the change of tone color are stored in the tone color data storage device, a musical tone is generated based on the tone color data, and, when the tone color data selected by the change of tone color are not stored in the tone color data storage device, the tone color data are read out from a storage medium storing the selected tone color data, and transferred to and stored in the tone color data storage device, while generating a musical tone based on other tone color data similar to the selected tone color data.

To attain the above object, the present invention also provides a method of processing music data, comprising the steps of storing music data in storage means, picking up a tone color selection event included in the music data stored in the storage means, and inserting a load command event for generating a command to load tone color data selected by the tone color selection event, at a position in the stored music data which is located a predetermined time period before a position at which the tone color selection event is picked up.

Preferably, the method of processing music data further comprises the step of inserting an unload command event for generating a command to unload the tone color data selected just before occurrence of the tone color selection event when detecting that the tone color data selected just before occurrence of the tone color selection event will not be selected after the tone color selection event.

To attain the above object, the present invention provides an apparatus for processing music data, comprising a musical data storage device that stores storing music data, a pickup device that picks up a tone color selection event included in the music data stored in the storage device, and a load command event insertion device that inserts a load command event for generating a command to load tone color data selected by the tone color selection event, at a position in the stored music data which is located a predetermined time period before a position at which the tone color selection event is picked up.

To attain the above object, the present invention further provides a method of reproducing music data, comprising the steps of supplying music data including event data and timing data indicative of the timing of occurrence of the event data, picking up a tone color selection event included in the music data, prior to reproduction of the supplied music data, reproducing the music data by successively reading out respective data of the supplied music data, so that an event designated by a corresponding one of the event data occurs in the timing designated by the timing data, generating a load command event to generate a command to load the tone color data, prior to occurrence of the tone color selection event, during reproduction of the supplied music data, transferring the tone color data from second storage means in which tone color data selected by the tone color selection event are stored to first storage means to store the selected tone color data therein, in response to the command to load the tone color data, and generating a musical tone in response to occurrence of the event, using the tone color data stored in the first storage means.

Preferably, the method of reproducing music data further comprises the steps of generating an unload command event to generate a command to unload tone color data that will not be used, during reproduction of the supplied music data, and deleting the selected tone color data from the first storage means, in response to the command to unload the tone color data.

To attain the object, the present invention further provides an apparatus for reproducing music data, comprising a supply device that supplies music data including event data and timing data indicative of the timing of occurrence of the event data, a pickup device that picks up a tone color selection event included in the music data, prior to reproduction of the supplied music data, a reproduction device that reproduces the music data by successively reading out respective data of the supplied music data, so that an event designated by a corresponding one of the event data occurs in the timing designated by the timing data, a load command event generation device that generates a load command event to generate a command to load the tone color data, prior to occurrence of the tone color selection event, during reproduction of the supplied music data, a transfer device that transfers the tone color data from a second storage device in which tone color data selected by said tone color selection event are stored to a first storage device to store the selected tone color data therein, in response to the command to load the tone color data, and a musical tone generation device that generates a musical tone in response to occurrence of the event, using the tone color data stored in the first storage device.

To attain the above object, the present invention further provides a storage medium that stores a program which can be carried out by a computer, comprising a storage module that stores tone color data in tone color data storage means, a search module that searches the tone color data storage means upon occurrence of performance information indicative of a change of tone color, to determine whether tone color data selected by the change of tone color are stored in the tone color data storage means, and a control module that controls musical tone generation such that when a result of searching indicates that the tone color data selected by the change of tone color are stored in the tone color data storage means, a musical tone is generated based on the tone color data, and, when the tone color data selected by the change of tone color are not stored in the tone color data storage means, the tone color data are read out from a storage medium storing the selected tone color data, and transferred to and stored in the tone color data storage means, while generating a musical tone based on other tone color data similar to the selected tone color data.

Preferably, the storage medium further comprises a module that deletes tone color data that become unnecessary, out of the tone color data stored in the tone color data storage means, under a predetermined condition.

To attain the above object, the present invention further provides a storage medium that stores a program that can be carried out by a computer, comprising a storage module that stores music data in storage means, a pickup module that picks up a tone color selection event included in the music data stored in the storage means, and a load command event insertion module that inserts a load command event for generating a command to load tone color data selected by the tone color selection event, at a position in the stored music data which is located a given time period before a position at which the tone color selection event is picked up.

Preferably, the storage medium further comprises a module that inserts an unload command event for generating a command to unload the tone color data selected just before occurrence of the tone color selection event when detecting that the tone color data selected just before occurrence of the tone color selection event will not be selected after the tone color selection event.

To attain the above object, the present invention provides a storage medium that stores a program that can be carried out by a computer, comprising a supply module that supplies music data including event data and timing data indicative of the timing of occurrence of the event data, a pickup module that picks up a tone color selection event included in the music data, prior to reproduction of the supplied music data, a reproduction module that reproduces the music data by successively reading out respective data of the supplied music data, so that an event designated by a corresponding one of the event data occurs in the timing designated by the timing data, a load command event generation module that generates a load command event to generate a command to load the tone color data, prior to occurrence of the tone color selection event, during reproduction of the supplied music data, a transfer module that transfers the tone color data from second storage means in which tone color data selected by the tone color selection event are stored to first storage means to store the selected tone color data therein, in response to the command to load the tone color data, and a musical tone generation module that generates a musical tone in response to occurrence of the event, using the tone color data stored in the first storage.

Preferably, the storage medium further comprises an unload command generation module that generates an unload command event to generate a command to unload tone color data that will not be used, during reproduction of the supplied music data, and a deletion module that deletes the designated tone color data from the first storage means, in response to the command unload the tone color data.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 1:
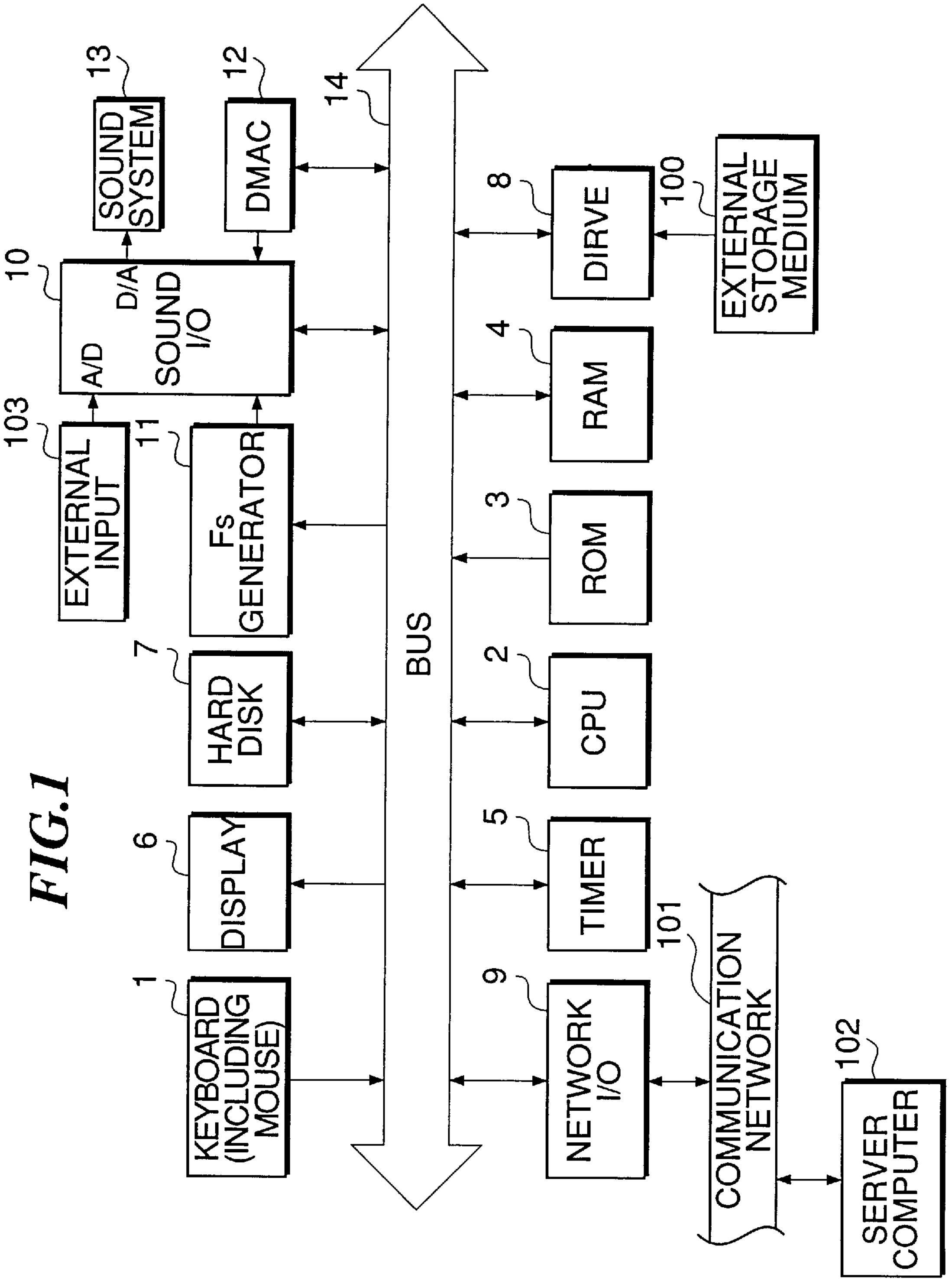
FIG. 1 is a block diagram schematically showing the construction of a general-purpose computer to which a method of generating musical tones according to one embodiment of the present invention is applied.

FIG. 1 schematically shows the construction of a general-purpose computer to which a musical tone-generating method according to one embodiment of the invention is applied.

In FIG. 1, the computer of the present embodiment includes a keyboard (including a mouse as a pointing device) 1 for entering various kinds of information, a CPU 2 that governs control of the whole system, a ROM 3 that stores control programs to be executed by the CPU 2, table data and others, and a RAM 4 that temporarily stores control programs to be executed by the CPU 2, various application programs, music data (MIDI data files), various tone color data used upon reproduction of the music data, various kinds of input information, operation results and others. The computer also includes a timer 5 for counting an interrupt time for a timer interrupt routine and various other time periods, a display 6 that displays various kinds of information and includes a large-sized LCD or CRT, LED and others, a hard disc device 7 that includes a hard disc or discs storing the above-mentioned control programs, various application programs, music data and various tone color data which are to be loaded into the RAM 4, and various other data, and a drive device 8 that drives an external storage medium, such as CD-ROM (Compact Disc-Read Only Memory), MO (Magneto-Optical disc), MD (Mini Disc) or the like. The computer further includes a network I/O 9 which transmits and receives data to and from a server computer 102, for example, through a communication network 101, a sound I/O 10 consisting of an LSI called "codec", a sampling frequency generator 11 that generates a sampling frequency Fs and supplies the frequency to the sound I/O 10, a DMAC (Direct Memory Access Controller) 12, described hereinbelow, and a sound system 13, such as a speaker, for converting analog musical tone signals received from the sound I/O 10 into sound. To output musical tone waveform data produced in the sound I/O 10, the DMAC 12 directly reads out the musical tone waveform sample by sample from a musical tone waveform buffer DMAB provided at a predetermined position of the RAM 4, and outputs the musical tone waveform to the sound I/O 10.

The component elements 1–12 described above are connected to each other through a bus 14, and the communication network 101 is connected to the network I/O 9, while an external input 103, the sampling frequency generator 11, the DMAC 12 and the sound system 13 are connected to the sound I/O 10.

The hard disc device 7 stores control programs to be executed by the CPU 2, as described above. Where some kinds of control programs are not stored in the ROM 3, the RAM 4 reads the control programs stored in the hard disc device 7, so that the CPU 2 can perform substantially the same operations as in the case where the control programs are stored in the ROM 3. This arrangement facilitates addition of control programs and upgrading of the version of the programs.

As described above, the network I/O 9 is connected to the communication network 101, such as LAN (local area network), Internet and telephone line, and is connected to the server computer 102 through the communication network 102. Where some kinds of programs or parameters are not stored in the hard disc device 7, the network I/O 9 may be used for downloading desired programs and parameters from the server computer 102. A client computer (general-purpose computer in the present embodiment) transmits commands to the server computer 102 through the network I/O 9 and communication network 101, to request downloading of the desired programs and parameters. The server computer 102 receives the commands and delivers the requested programs and parameters to the client computer through the communication network 101, and the computer receives these programs and parameters through the network I/O 9, and stores them in the hard disc device 7. In this manner, the downloading is completed. In addition, the computer of the present embodiment may be provided with an interface for directly transmitting and receiving data to and from an external computer or the like.

The sound I/O 10, which is formed by the LSI called "codec", as described above, mainly performs the following operations.

1) The sound I/O 10, which is provided with an A/D converter and a D/A converter, converts analog musical tone signals received from the external input 103 into digital signals by means of the A/D converter, and compresses the data according to ADPCM (Adaptive Differential Pulse Code Modulation) system. The sound I/O 10 also expands or decompresses the compressed data and generates the resulting data to the D/A converter.

2) The sound I/O 10, which incorporates two FIFO (First In First Out) memories (not shown), brings A/D converted waveform data into the input FIFO memory, and transmits waveform data (samples) stored in the output FIFO memory to the D/A converter, in response to sampling clock signals of the frequency Fs received from the sampling frequency generator 11.

3) Where data are stored in the input FIFO memory, or where an empty space is present in the output FIFO memory, a signal (hardware interrupt signal) for requesting data processing (process of FIG. 18, described later) is generated and delivered to the DMAC 12.

The DMAC 12 transmits waveform data (samples) stored in the musical tone waveform buffer DMAB to the sound I/O 10 sample by sample, in response to the hardware interrupt signal from the sound I/O 10, namely, a sample request interrupt signal generated by the sound I/O 10 at time intervals corresponding to the repetition period (1/Fs) of the above sampling clock. Upon receipt of the waveform data, the sound I/O counts the number of samples transferred from the DMAC 12, and generates a hardware interrupt signal indicating completion of reproduction of one frame of waveform data, each time samples corresponding in number to ½ (one frame of waveform data, described later) of the overall buffer size of the musical tone waveform buffer DMAB are received. Namely, the musical tone waveform buffer DMAB is adapted to store two frames of waveform data, and as many musical tone waveform samples as that corresponding to ½ of the buffer size of the waveform buffer DMAB are produced at a time, in a waveform producing process of FIG. 17, described later.

Figure 2:
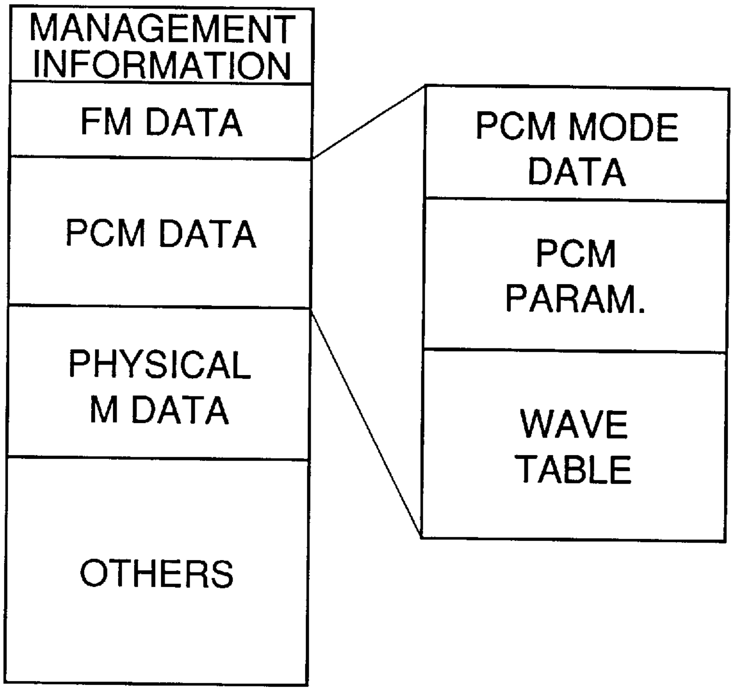
FIG. 2 is a view showing one example of tone generator data stored in a tone generator data storage region.

FIG. 2 shows one example of tone generator data stored in a tone generator data storage region. The tone generator data storage region for storing tone generator data is provided at a predetermined position of the RAM 4, and the capacity of this region is variable depending upon the amount of the stored tone generator data to be stored therein.

As shown in FIG. 2, the tone generator data include data (FM data, PCM data, physical model data) produced in respective types of tone generator modes, management information, and other data. The data produced in each type of tone generator mode consist of mode data and tone color data. In FIG. 2 showing the format of PCM data as a typical example of the data produced in each type of tone generator mode, PCM mode data correspond to the above-indicated mode data, and parameter data (PCM PARAM.) and waveform table data (WAVE TABLE) correspond to the above-indicated tone color data.

The mode data is comprised of a driver (program) that performs an operation suited for each type of transaction events, a production program for producing musical tone waveform data according to the relevant tone generator mode, and a work area.

The tone color data differ from one tone generator mode to another. In FM tone generator mode, the tone color data include the number of operators, algorithms, parameters for controlling EG and others of each operator, and a table of basic waveform data, such as a sine wave. In PCM tone generator mode, the tone color data include parameters for EG, filter(s) and the like, and a waveform table that provides the basis of each musical tone. In physical model tone generator mode, the tone color data include algorithm control data, various coefficients, parameters for EG and others, and nonlinear tables.

In the present embodiment, the amounts of the mode data and tone color data stored in the tone generator data storage region are as follows: FM data consist of mode data having 60 kilobytes (KB), and tone color data having 40 bytes (/1 tone color)×128 tone colors (all of the tone colors in GM system), and PCM data consist of mode data having 70 kilobytes (KB), and tone color data having several to several dozens of kilobytes (/1 tone color)× several dozens of tone colors, while the physical model data consist of mode data having 20 kilobytes (KB), and tone color data having 20 kilobytes (/1 tone color)× several tone colors.

It will be understood from the above that the amount of the tone generator data (composed of mode data and tone color data) of the FM data is smaller than that of the tone generator data of other tone generator modes. In the present embodiment, therefore, where the FM tone generator mode is not selected for a musical piece to be reproduced, the mode data and the tone color data corresponding to all of the basic tone colors (128 tone colors) in the above GM system in the FM tone generator mode are always stored in a corresponding region (hereinafter referred to as "FM tone generator data storage region") of the tone generator data store region, so as to permit substitute tone generation (generation of musical tones with a tone color similar to the selected tone color).

Since the musical tone waveform data are produced according to a software program in the present embodiment, a plurality of tone generator modes may be designated for one music data, such that different tone generator modes are designated for different performance parts, for example, to produce the musical tone waveform data. For example, the musical tone waveform of one musical piece or song is produced only by using the FM tone generator mode, while the musical tone waveform of another song is produced by using the FM tone generator mode and PCM tone generator mode. In such cases, since different tone generator modes are designated for respective songs, the data produced in the designated tone generator mode and stored in the tone generator data storage region are determined depending upon the relevant music data. In the example of FIG. 2, three types of tone generator modes are designated for one song. It is to be understood that the tone generator modes are not limited to these three types (FM tone generator mode, PCM tone generator mode, and physical model tone generator mode), but may include other tone generator modes, such as chaos tone generator mode and harmonic composition mode, for example.

The number of musical tones that may be concurrently generated also differs depending upon the tone generator mode; for example, 28 tones in the FM tone generator mode, 24 tones in the PCM tone generator mode, and 2 tones in the physical model tone generator mode. Further, the number of musical tones generated may be changed between a plurality of tone generator modes. For example, the number of musical tones concurrently generated in the FM tone generator mode may be reduced, and the number of musical tones concurrently generated in the PCM tone generator mode may be increased instead.

Figure 3:
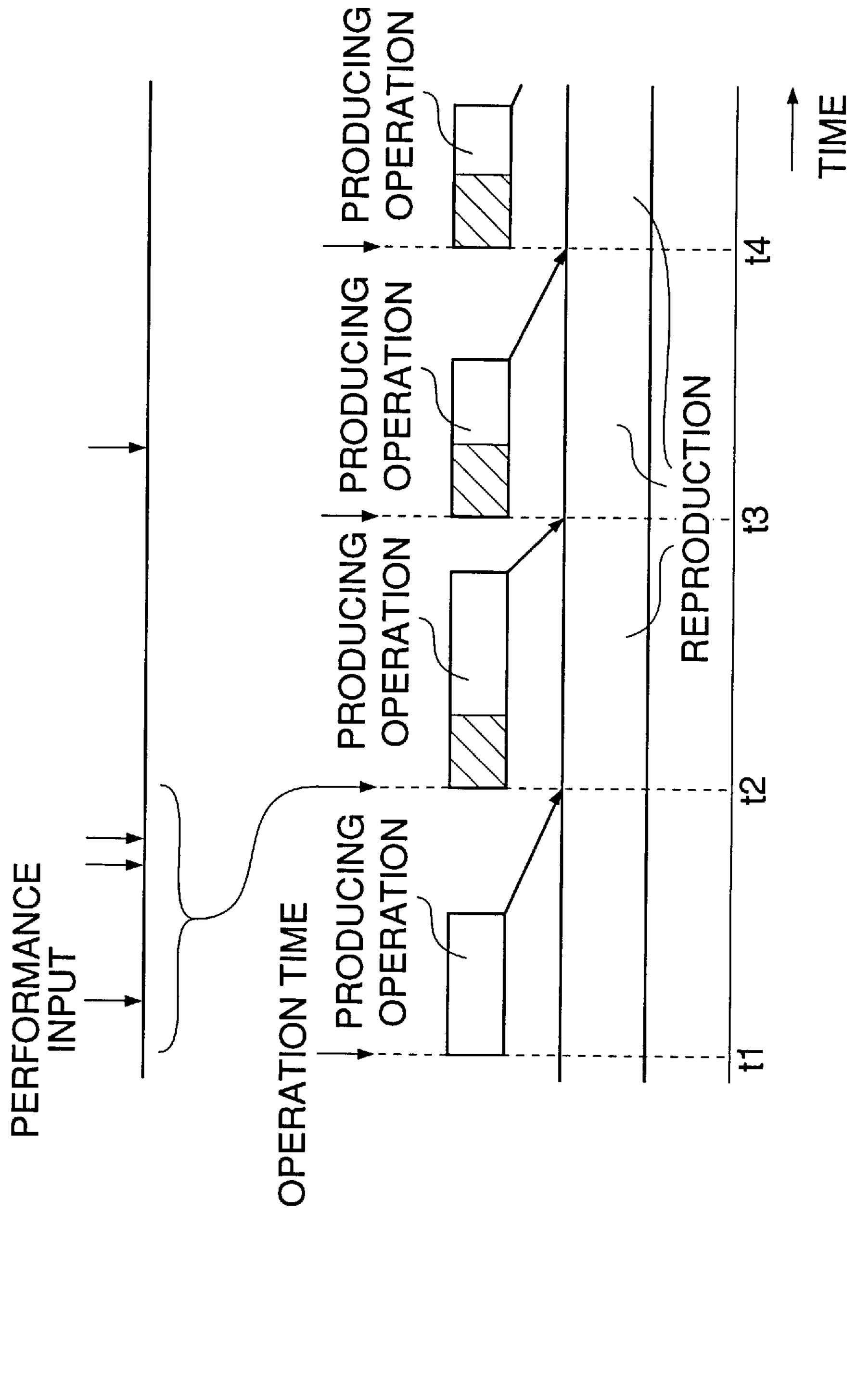
FIG. 3 is a view useful in explaining the summary of a musical tone-generating process performed by the computer of FIG. 1.

The summary of processing for computing the musical tone waveforms, described above will be explained referring to FIG. 3. In FIG. 3, when music data start being reproduced, performance input data (MIDI events) start being supplied to an input buffer (not shown).

Figure 4:
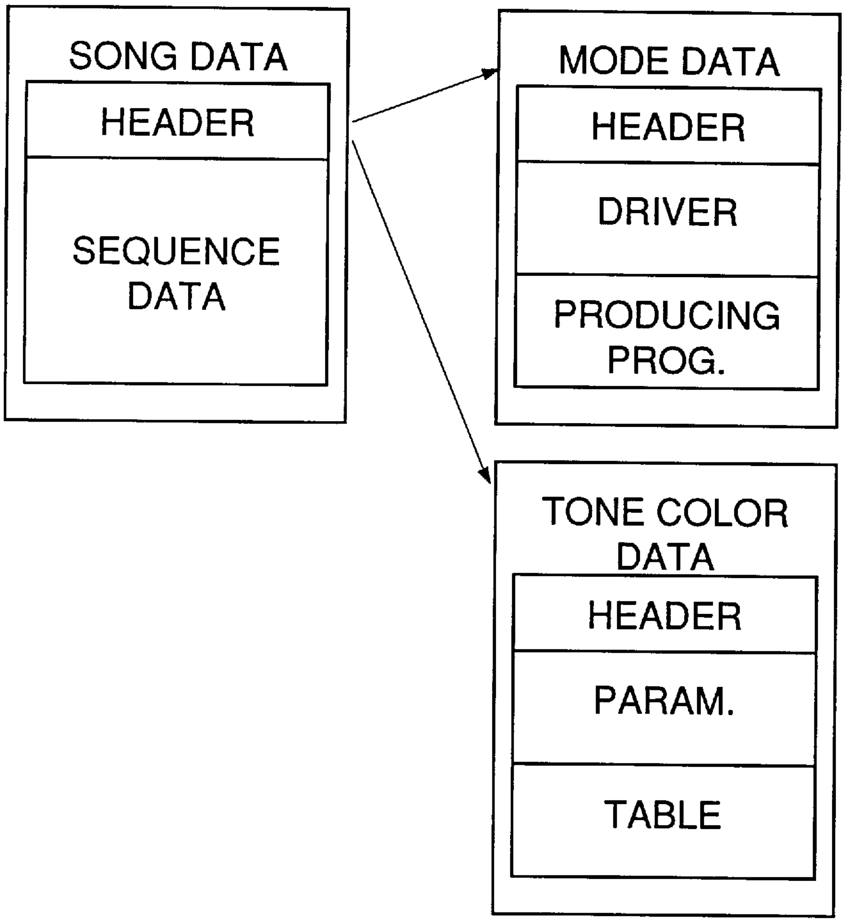
FIG. 4 is a view showing a data format of music data.

In this connection, the music data may be produced in SMF (Standard MIDI File) format (the music data produced in this format will be hereinafter referred to "music data SMF"), and the thus produced music data are composed of header data and sequence data, as shown in FIG. 4. The header data include such data as the title of the song, amount of data, the date of production, and the file format (SMF or GM, for example), and the sequence data include various kinds of MIDI event data, such as note-on/-off event data, control change event data, program change event data, bank select event data (this data is one type of control change event data), and system exclusive event data, and timing data indicating the time of occurrence of each MIDI event data. In the present embodiment in which musical tones may be produced for the same song in a maximum of three types of tone generator modes (FM tone generator mode, PCM tone generator mode, and physical model tone generator mode), the sequence data may include, as needed, mode switch event data for switching these three types of tone generator modes. Since the mode switch even data are currently not adopted as event data according to the MIDI standard, the system exclusive even data provide the mode switch event data in the present embodiment.

Referring back to FIG. 3, the CPU 2 performs musical tone generation processing in response to a start opportunity set at regular intervals (each of which will be referred to as "frame") of a predetermined time duration, based on performance input data supplied to a frame just before the current frame, according to the tone generator mode designated by the performance input data. For example, the musical tone generation processing based on the performance input data supplied to the frame from the point of time t1 to t2 is executed in the frame from the point of time t2 to t3.

If one frame of musical tone waveform data are produced in the musical tone generation processing in the above manner, the waveform data are written into the musical tone waveform buffer DMAB, and reproduction of the written data is reserved. In each frame, the above-indicated DMAC 12 reads out musical tone waveform data sample by sample from the musical tone waveform buffer DMAB in which reproduction of the waveform data is reserved in the immediately preceding frame, and generates and delivers the read waveform data to the sound I/O 10. For example, as shown in FIG. 3, the musical tone waveform data that are produced in the frame from the time t2 to the time t3 and written into the musical tone waveform buffer DMAB for reservation of its reproduction are read out in the frame from the time t3 to t4, and reproduced.

In FIG. 3, hatched portions in musical tone-generating operation blocks indicate that the operation for producing musical tone waveform is performed in the physical model tone generator mode. Since a large load is required to produce one tone by the musical tone-generating operation in the physical model tone generator mode, only one tone is produced in each frame according to this mode in the present embodiment. Thus, the time of this operation is substantially constant as shown in FIG. 3. In the regions other than the hatched portions, the musical tone waveform producing operations according to other tone generator modes are performed.

Referring next to FIG. 5 through FIG. 18, the control processing performed by the computer of the present embodiment will be described in detail.

Figure 5:
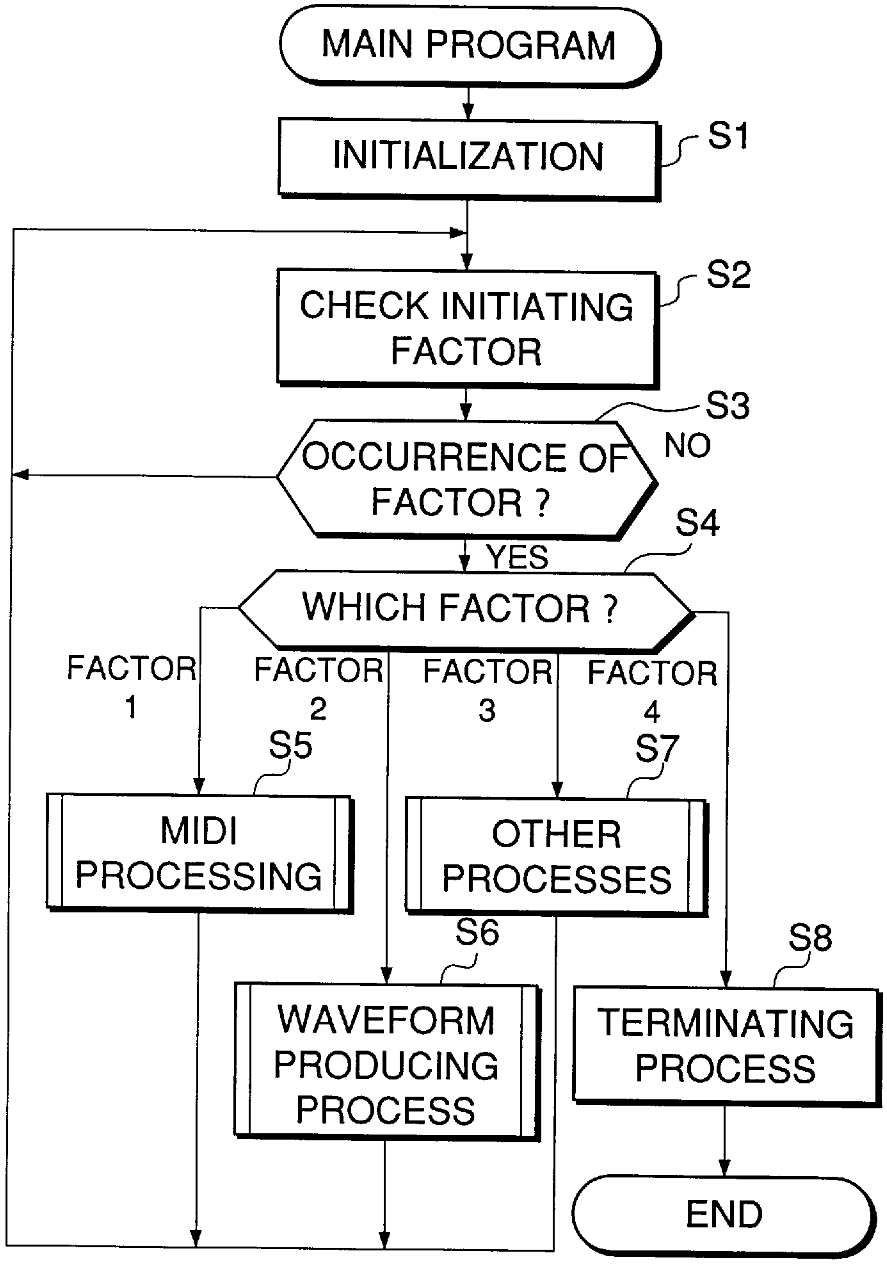
FIG. 5 is a flowchart showing a main program executed by a CPU appearing in FIG. 1.

FIG. 5 shows a main program executed by the computer, in particular the CPU 3, of the present embodiment. Initially, a step 1 is executed to effect initialization by clearing RAM 4, etc. Then, checking of occurrence of each of initiating factors are executed at a step S2, as described below:

Initiating factor 1: any of the above-indicated MIDI events occurs.

Initiating factor 2: reproduction of one frame of musical tone waveform data is completed, and the hardware interrupt signal, referred to above is generated by the sound I/O 10.

Initiating factor 3: any request event other than those constituting the initiating factors 1, 2, 4 is detected; for example, an operation event indicating that the user operates an input operating part, such as a mouse or keyboard 1, is detected;

Initiating factor 4: the user operates to terminate the main routine, and this operation event is detected.

At the next step S3, it is determined whether any of the above-described initiating factors 1–4 has occurred. If none of the initiating factors 1–4 has occurred, the program returns to the step S2. If any of the initiating factors 1–4 has occurred, on the other hand, the program proceeds to a step S4 to determine which one of the above initiating factors has occurred.

If the result of determination at the step S4 indicates that the "initiating factor 1" has occurred, the program proceeds to a step S5 to execute MIDI processing with respect to the generated MIDI event. If the "initiating factor 2" has occurred, the program proceeds to a step S6 to carry out the waveform producing process as described later referring to FIG. 17. If the "initiating factor 3" has occurred, the program proceeds to a step S7 to carry out other processes with respect to the generated event. If the "initiating factor 4" has occurred, the program proceeds to a step S8 to carry out a terminating process in which a display on the display 6 is brought back to the condition before the present main program is initiated.

After any of the above steps S5–S7 is finished, the program returns to the step S2 to repeat the above-described processing. If the terminating process of the step S8 is finished, the present main routine is terminated or finished.

Figure 6:
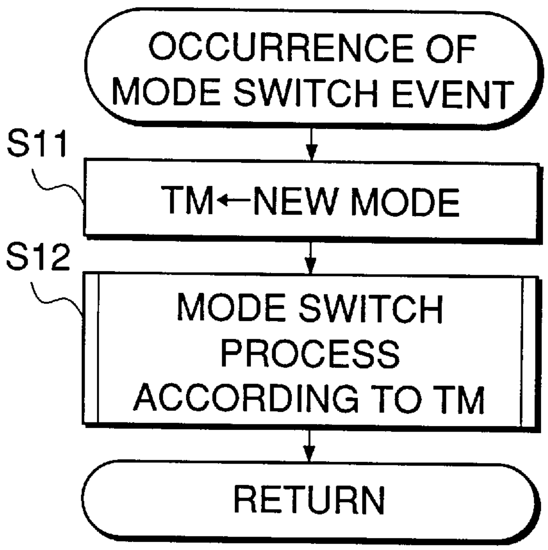
FIG. 6 is a flowchart showing a procedure of handling a mode switch event.

FIG. 6 shows the procedure of handling a mode switch event, which is one process performed during the MIDI signal processing at the step S5 of FIG. 5. This process is initiated when a mode switch event as one type of the above-indicated MIDI events occurs. Since the mode switch event is classified as system exclusive even data as described above, the present process is initiated when the mode switch event allocated to the system exclusive event data occurs.

In FIG. 6, the system exclusive event data received by the input buffer are analyzed, and the tone generator mode to which the mode is newly switched or changed is stored as a new mode in a region "TM" provided at a predetermined position of the RAM 4 (hereinafter the content of the region TM will be called "tone generator mode TM") at a step S11. Then, a mode switch subroutine for the selected tone generator mode TM is executed at a step S12 as described below, followed by terminating the present mode switch event process.

Figure 7:
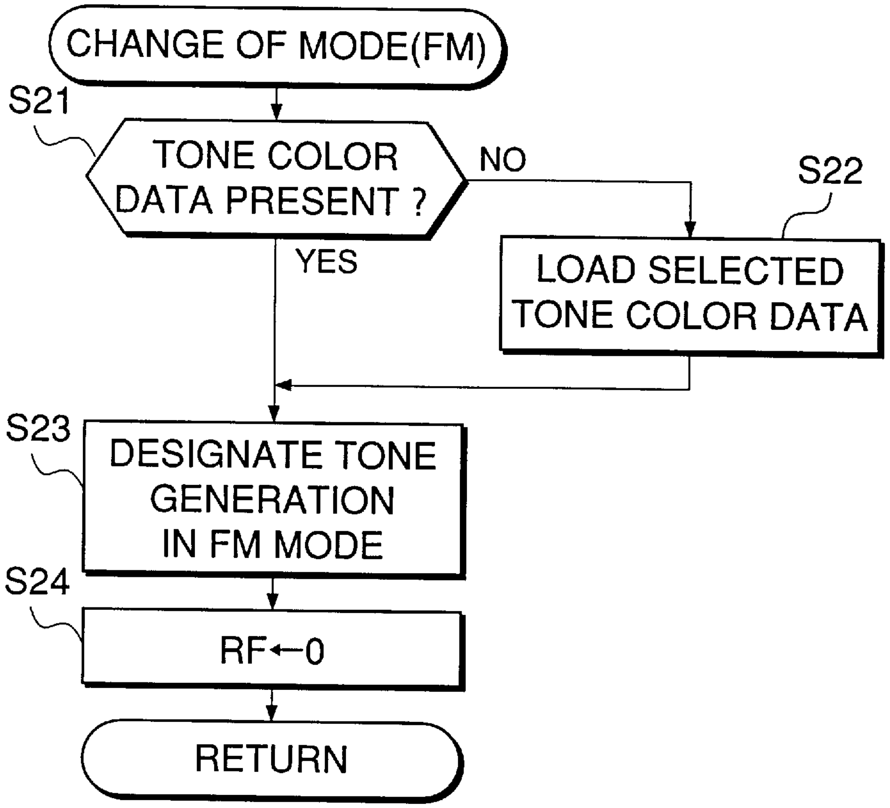
FIG. 7 is a flowchart showing in detail a mode switch process performed when an FM tone generator mode is designated as a tone generator mode.

FIG. 7 shows in detail a mode switch process performed when the FM tone generator mode is designated as the tone generator mode TM, which is one process in the mode switch subroutine of the step S12.

In FIG. 7, a step S21 is initially executed to determine whether the selected tone color data are stored in the above-indicated FM tone generator data. In this connection, since the tone color is selected based on the bank select event data and program change event data, it is assumed that these events have already occurred by the time when the step S21 is executed. In the following description, the selection of the tone color is assumed to have been made before execution of a process, if any, which determines whether or not the tone color data is stored in the tone generator data storage region.

If the step S21 determines that the selected tone color data are not stored in the FM tone generator data storage region, the tone color data are read out from the hard disc device 7, and loaded into the FM tone generator data storage region, and the program then proceeds to a step S23. If the selected tone color data are stored in the FM tone generator data storage region, a step S22 is skipped and the program proceeds to the step S23.

As described above, the tone generator data according to the FM tone generator mode may be used for substitute tone generation even in the case where a song for which the FM tone generator mode is not selected is reproduced, and therefore the basic tone color data of this mode are normally loaded. However, the user may select a tone color other than that of the basic tone color data, for example, tone color produced by the user, and the processing of the step S21 deals with this case.

At the step S23, the tone generation according to the tone generator mode TM is designated. Then, a step S24 is executed to reset (to "0") a substitute tone generation request flag RF which represents a substitute tone generation request as "1", followed by terminating the present mode switch process.

Figure 8:
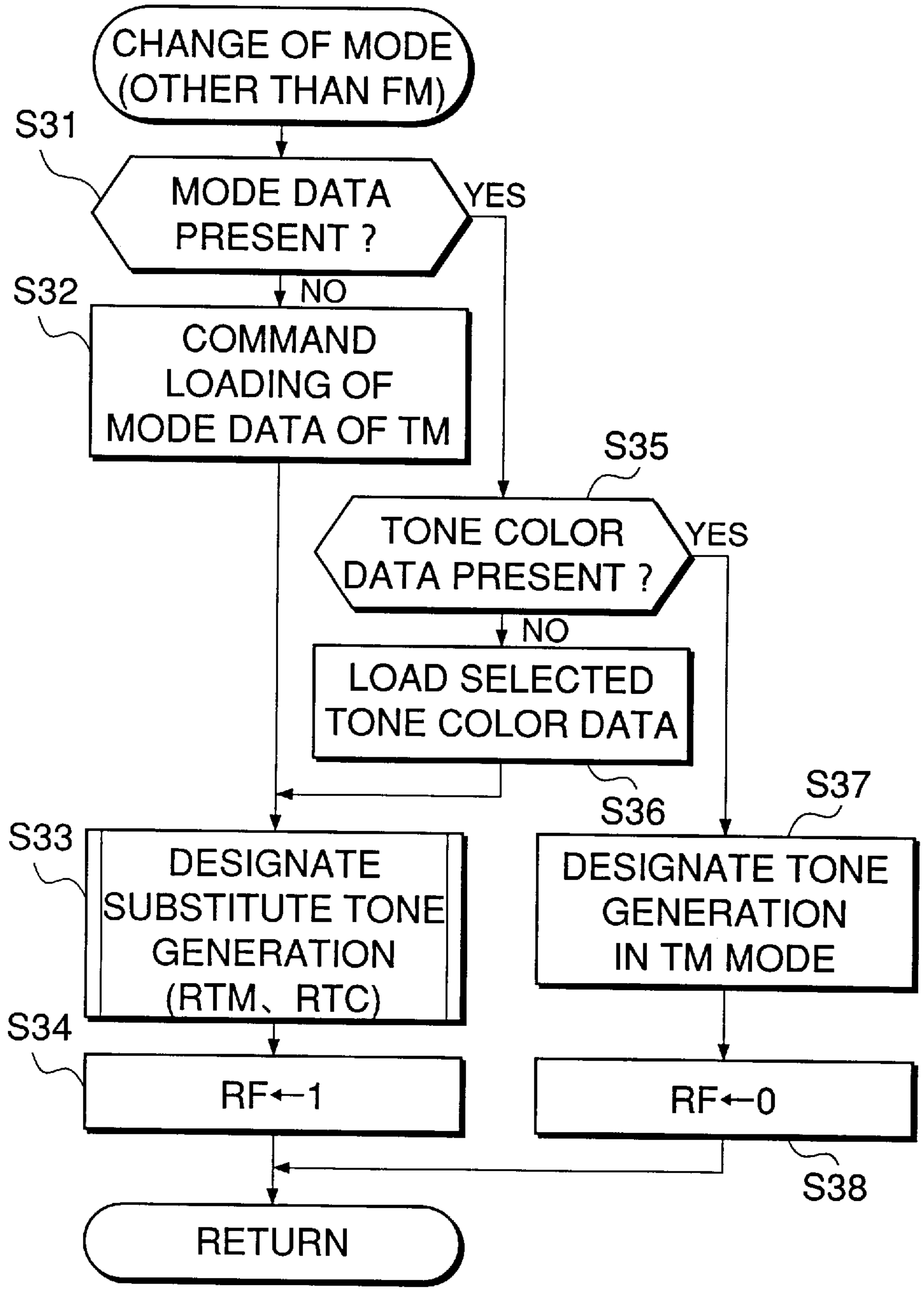
FIG. 8 is a flowchart showing in detail a mode switch process performed when a tone generator mode other than the FM tone generator mode is designated as the tone generator mode.

FIG. 8 shows in detail a mode switch process performed when a tone generator mode (PCM tone generator mode or physical model tone generator mode) other than the FM tone generator mode is designated as the tone generator mode TM. This is one process in the mode switch subroutine of the step S12.

In FIG. 8, a step S31 is initially executed to determine whether the mode data corresponding to the selected tone color is stored in a corresponding region of the tone generator data storage region. If the mode data are not stored, the program proceeds to a step S32. If the mode data are stored, on the other hand, the program proceeds to a step S35.

Figure 9:
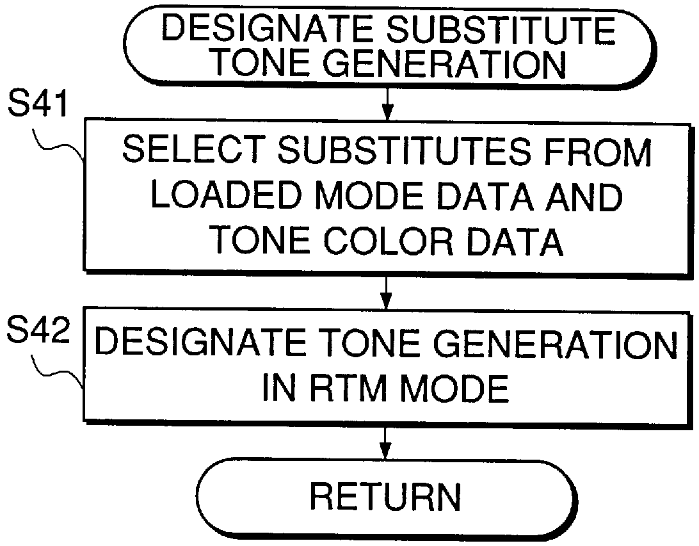
FIG. 9 is a flowchart showing in detail a subroutine for designating substitute tone generation in FIG. 8.

At the step S32, a command is generated to load the above mode data, namely, mode data corresponding to the tone generator mode TM, and at a step S33, a substitute tone generation-designating subroutine, described later referring to FIG. 9, is executed. Then, the substitute tone generation request flag RF is set to "1" at a step S34, and then the present mode switch process is terminated.

At the step S35, similarly to the step S21 of FIG. 7, it is determined whether or not the tone color data corresponding to the selected tone color are stored in a corresponding region of the tone generator data storage region. If the relevant tone color data are not stored, the program proceeds to a step S36 to read out the tone color data from the hard disc device 7 and load the data into a corresponding region of the tone generator data storage region, in the same manner as at the step S22 of FIG. 7. Thereafter, the program proceeds to the step S33.

If the step S35 determines that the tone color data are already stored in a corresponding region of the tone generator data storage region, a step S37 is executed to immediately designate tone generation based on the tone generator mode TM. Then, the substitute tone generation request flag RF is reset at a step S38, followed by the present mode switch process being terminated. When the program goes from the step S35 to the step S37, the mode data corresponding to the tone generator mode TM and the selected tone color data are both stored in the corresponding regions in the tone generator data storage region, and therefore the tone generation can be immediately designated.

FIG. 9 shows in detail the substitute tone generation-designating subroutine of the step S33 of FIG. 8.

At a step 41 of FIG. 9, substitute mode data and substitute tone color data which are closest (similar) to the tone generator mode TM and selected tone color are selected from the mode data and tone color data loaded in the tone generator data storage region, and stored in respective regions RTM, RTC provided at predetermined positions of the RAM 4. In the following description, the content of the region RTM will be called "substitute mode RTM", and the content of the region RTC will be called "substitute tone color RTC". The substitute mode RTM and substitute tone color RTC are selected in the method as described below.

1) When tone color data close to the selected tone color are present in the tone color data loaded in the tone generator data storage region in association with the tone generator mode TM, the closest tone color data are used over the other data. In this case, the tone generator mode TM to which the tone color data close to the selected tone color belongs is set as the substitute mode RTM, and the tone color number of the similar tone color data is set as the substitute tone color RTC.

2) When tone color data close to the selected tone color are not present in the tone color data loaded in the tone generator data storage region in association with the tone generator method TM, the tone color data that are closest to the selected tone color are selected from the tone color data loaded in the tone generator data storage region in association with the FM tone generator mode, and used. In this case, the FM tone generator mode is set as the substitute mode RTM, and the tone color number of the similar tone color data is set as the substitute tone color RTC.

Then, the tone generation is designated based on the substitute mode RTM at a step S42, followed by the present substitute tone generation process being terminated.

In this manner, if a command to load the mode data and tone color data is generated in the process of handling a mode switch event, the process of loading the designated data, namely, the process of reading out the data from the hard disc device 7 and storing the data in a corresponding region of the tone generator data storage region, is carried out in response to this command while the MIDI signal processing or waveform production processing of FIG. 5, for example, is being performed.

Figure 10:
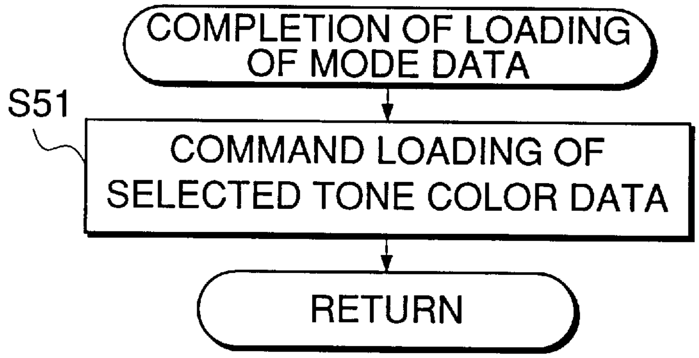
FIG. 10 is a flowchart showing a process of completing loading of mode data.

FIG. 10 shows the procedure of completing loading of the mode data, which is one of the other processes of the step S7 of FIG. 5, and is initiated when loading of the designated mode data is completed. In FIG. 10, a command to load the selected tone color data is generated at a step S51, and then the present process is terminated .

As described above, the tone color data are loaded following completion of loading of the mode data corresponding to the tone generator mode TM. This is because there is no possibility that the tone color data have been already loaded while the mode data are not loaded.

Figure 11:
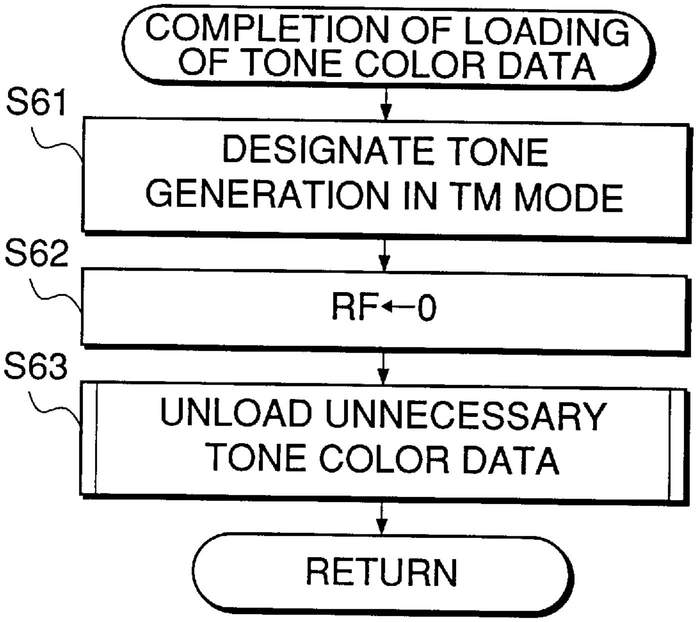
FIG. 11 is a flowchart showing a process of completing loading of tone color data.

FIG. 11 shows the procedure of completing loading of the tone color data, which is one of the other processes of the step S7 of FIG. 5, and is initiated when the loading of the designated tone color data is completed. In FIG. 11, a step S61 is initially executed to designate tone generation according to the tone generator mode TM. A step S62 is then executed to reset the substitute tone generation request flag RF, and then a subroutine for unloading unnecessary tone color data, indicated below, is executed at a step S63, followed by the present process being terminated.

Three different examples of the process of unloading unnecessary tone color data will be now explained.

Figure 12:
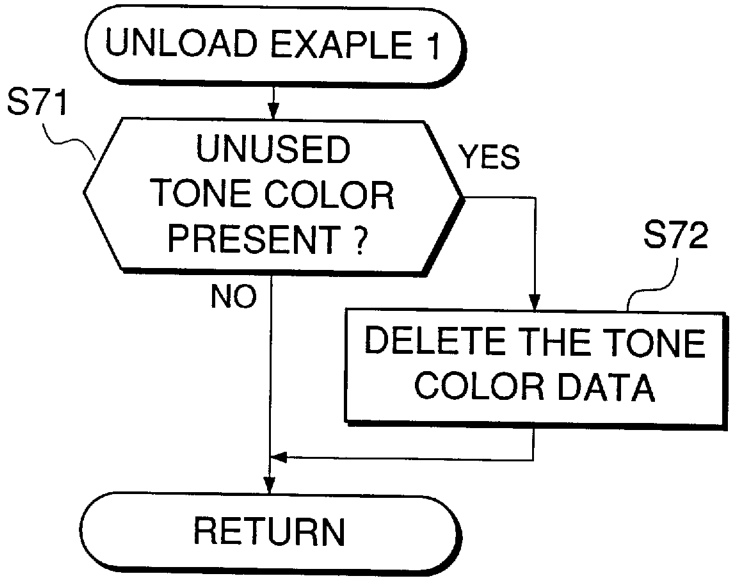
FIG. 12 is a flowchart showing a first example of unloading process.

FIG. 12 shows the first example of unloading process. In FIG. 12, a step S71 is executed to determine whether any tone color whose tone color data are stored in the tone generator storage region has not been used until the present unloading process is executed. If there is no tone color that has not been used, the present unloading process is immediately finished. If there is any tone color that has not been used, the tone color data corresponding to the unused tone color are deleted from the tone generator data storage region at a step S72, followed by the present unloading process being terminated.

Figure 13:
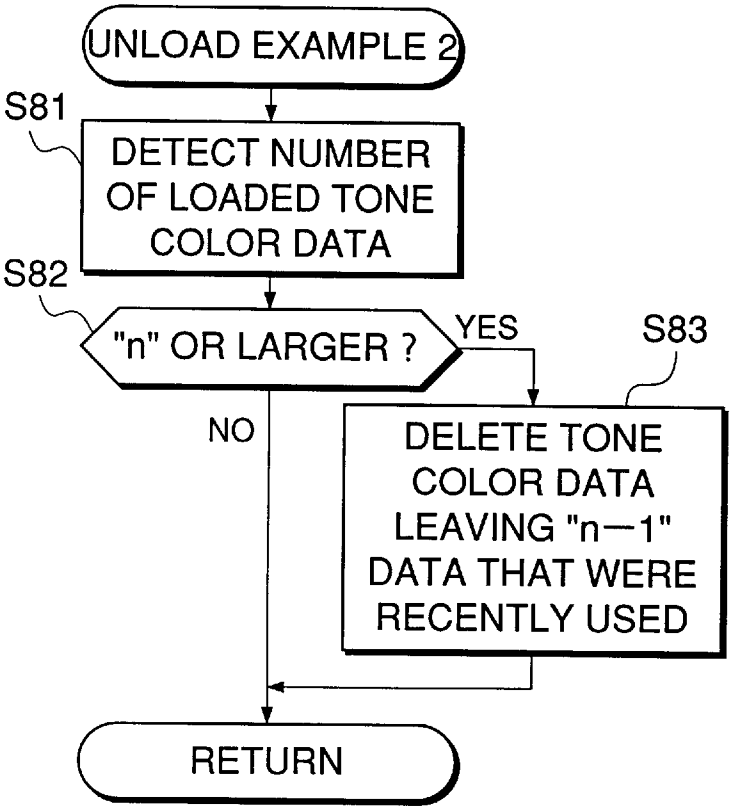
FIG. 13 is a flowchart showing a second example of unloading process.

FIG. 13 shows the second example of the unloading process. In FIG. 13, a step S81 is initially executed to detect the number of the tone color data loaded in the tone generator data storage region. A step S82 is then executed to determined whether the number of the loaded tone color data detected in step S81 is equal to or larger than a predetermined value "n", and, if the number is less than "n", the present unloading process is immediately terminated. If the number of the loaded tone color data is equal to or larger than "n", on the other hand, a step S83 is executed to delete one tone color data that have been loaded for the longest time from the tone generator data storage region, while leaving the (n-1) pieces of tone color data that were recently used, and then the present unloading process is terminated.

Figure 14:
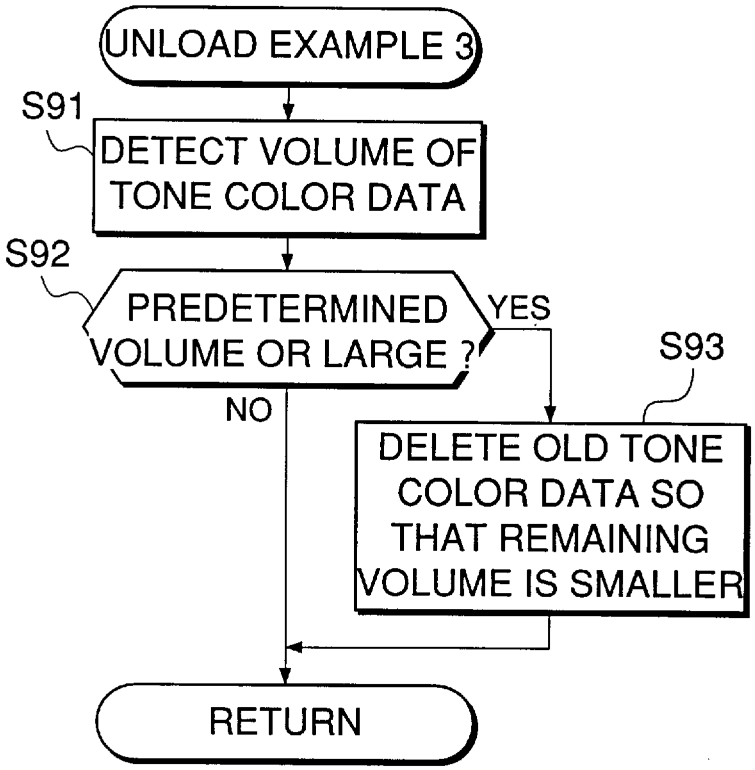
FIG. 14 is a flowchart showing a third example of unloading process.

FIG. 14 shows the third example of the unloading process. In FIG. 14, a step S91 is executed to detect the amount of all of the tone color data loaded in the tone generator data storage region. A step S92 is then executed to determine whether the amount detected at the step S91 is equal to or larger than a predetermined value, and, if the amount is less than the predetermined value, the present unloading process is immediately terminated. If the amount is equal to or larger than the predetermined value, on the other hand, the tone color data that have been loaded for the longest time is deleted at a step S93 so that the amount of all of the tone color data loaded in the tone generator data storage region becomes equal to or less than the predetermined value, and then the present unloading process is terminated.

Figure 15:
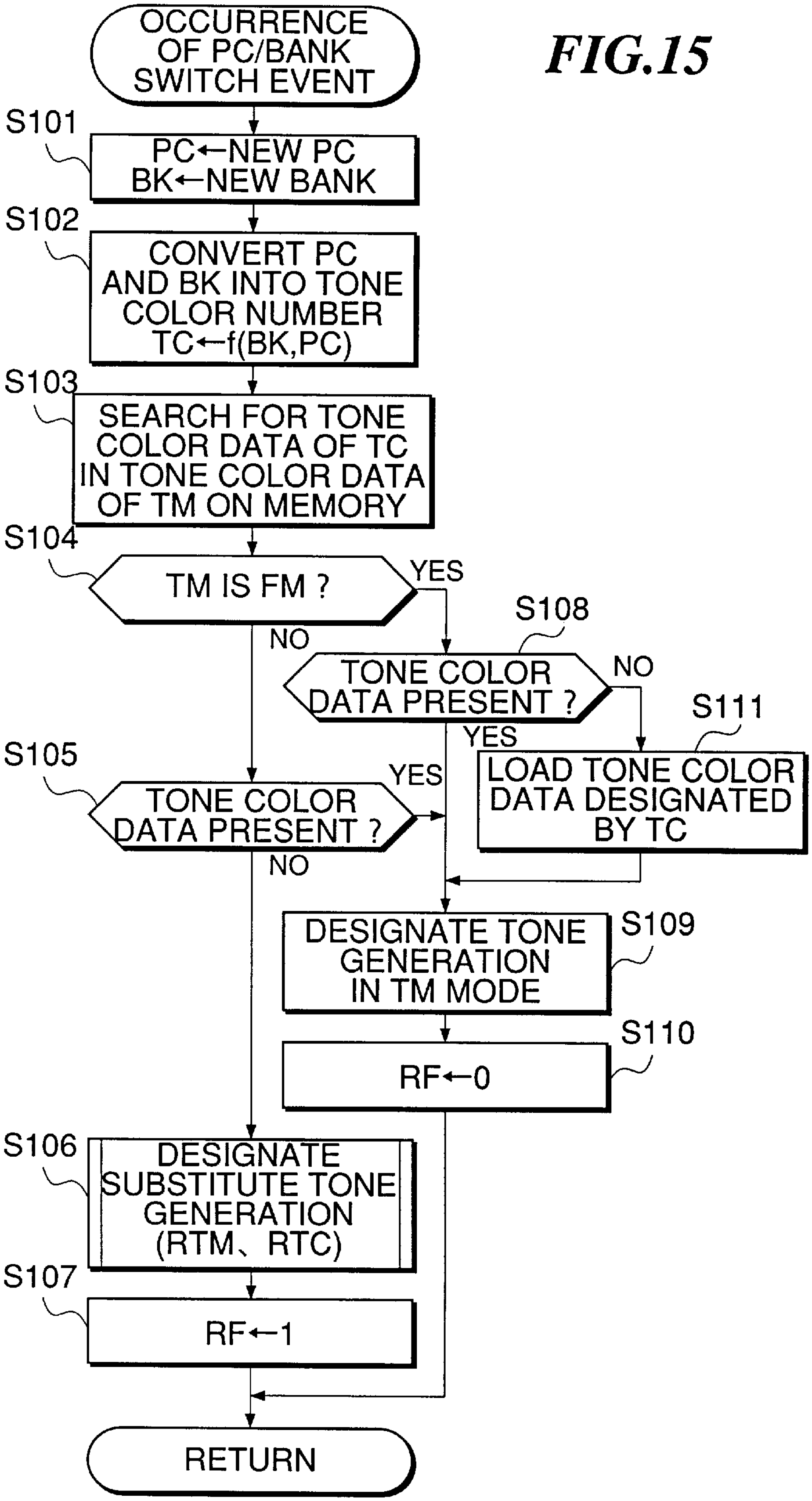
FIG. 15 is a flowchart showing a routine executed upon occurrence of a program change/bank switch event.

FIG. 15 shows a process of handling occurrence of a program change (PC)/bank switch event, which is one process performed during the MIDI signal processing of the step S5 of FIG. 5. The present process is initiated when the program change event and bank select event occur.

In FIG. 15, a step S101 is initially executed to analyze program change event data and bank select event data received by the input buffer, and store a newly designated program change in a predetermined region PC of the RAM 4 (the content of the region PC will be called "new program change PC"), and store a newly designated bank in a predetermined region BK of the RAM 4 (the content of the region BK will be called "new bank BK").

A step S102 is then executed to convert the new bank BK and the new program change PC into a corresponding tone color number, and store the tone color number in a predetermined region TC of the RAM 4 (the content of the region TC will be called "tone color number TC"). Since a particular tone color number "TC" is determined if the bank select event data and program change event data are determined as described above, the tone color number "TC" is a function of the new bank BK and new program change PC (f (BK, PC).

A step S103 is then executed to search the tone color data of the tone color number TC in the tone color data region of the tone generator data storage region corresponding to the tone generator mode TM, and a step S104 is executed to determine whether or not the tone generator mode TM is the FM tone generator mode.

If the step S104 determines that the tone generator mode TM is not the FM tone generator mode, a step S105 is executed to determine whether desired tone color data, namely, tone color data of the tone color number TC in the tone generator mode TM are loaded or not, based on results of the search conducted at the step S103. If the desired tone color data are not loaded, the above-described substitute tone generation-designating subroutine of FIG. 9 is executed at a step S106, and then the substitute tone generation request flag RF is set to "1" at a step S107, followed by the present routine being terminated. If the step S105 determines that the desired tone color data are loaded, the program proceeds to a step S109, referred to later.

If the step S104 determines that the tone generator mode TM is the FM tone generator mode, a step S108 is executed to determine whether desired tone color data are loaded or not, as in the above step S105, and, if the desired tone color data are not loaded, a step S111 is executed to load the tone color data designated by the tone color number TC in the same manner as in the step S22 of FIG. 7. If the desired tone color data are loaded, on the other hand, a step S111 is skipped, and the program proceeds to the step S109 to designate tone generation according to the tone generator mode TM, as in the above step 37 of FIG. 8, and then the substitute tone generation request flag RF is reset at a step S110, followed by terminating he present routine.

In the present embodiment, where the desired tone color data are not loaded when the FM tone generator mode is selected, the step S111 or S22 is executed to load the desired tone color data. The present invention, however; is not limited to this arrangement, but may be adapted such that a substitute tone color is selected and designated from the tone color data of the FM tone generator mode that have been loaded, for tone generation in the present loop, while the tone color data designated by the tone color number TC are loaded.

Figure 16:
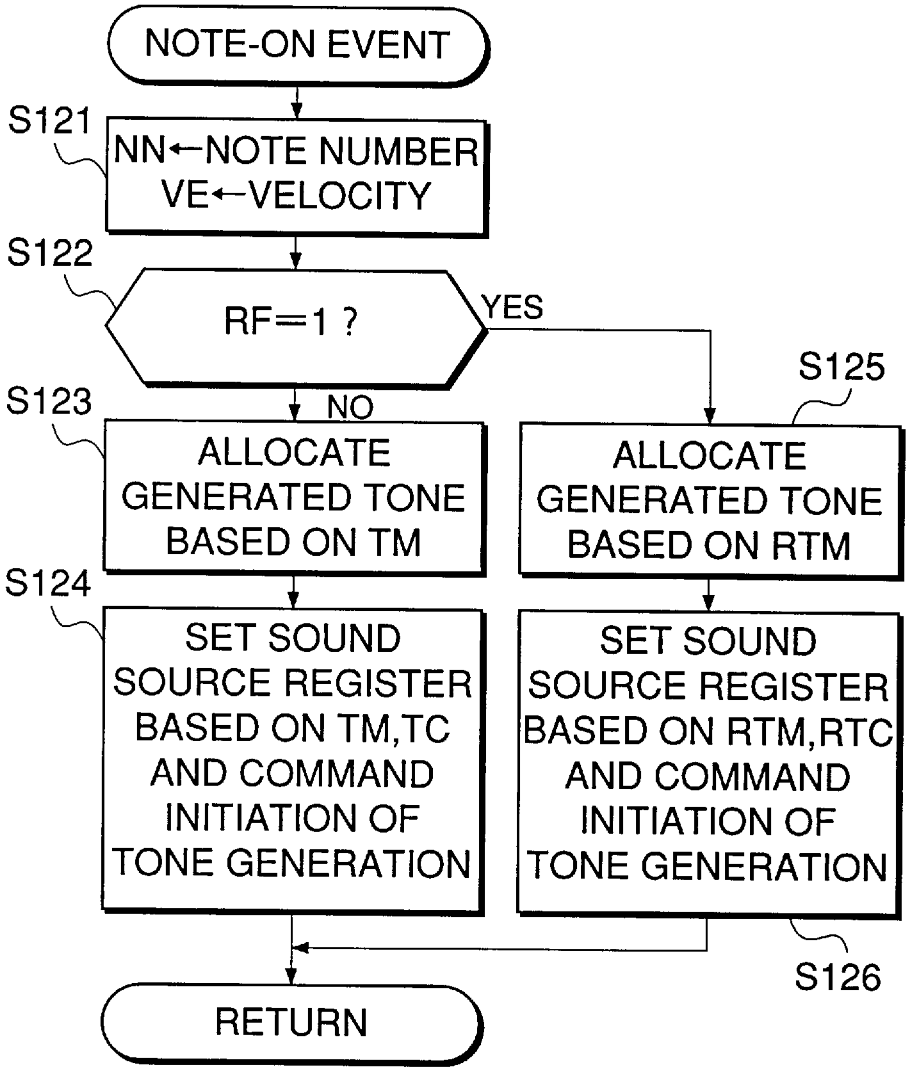
FIG. 16 is a flowchart showing a procedure of handling a note-on event.

FIG. 16 shows the procedure of handling a note-on event, which is one process executed during the MIDI signal processing of the step S5 of FIG. 5. This process is initiated upon occurrence of a note-on event as one type of the MIDI events.

In FIG. 16, a step S121 is initially executed to analyze note-on event data received by the input buffer, and store the note number of the note-on event data in a predetermined region NN of the RAM 4, while storing its velocity in a predetermined region VE of the RAM 4. A step S112 is then executed to determine whether or not the substitute tone generation request flag RF is "1". The program proceeds to a step S123 if the flag RF is set to "0", and proceeds to a step S125 if the flag RF is set to "1".

At the step S123, a channel through which the musical tone to be generated is allocated based on the tone generator mode TM, and at a step S124, musical tone data based on the tone generator mode TM and tone color number TC are set to a tone generator register (not shown) for the allocated channel, and a command to initiate tone generation is generated to produce and sound musical tone waveform data of the tone color number TC in the tone generator mode TM. Then, the processing of the note-on event is terminated.

At the step S125, a channel through which the musical tone is to be generated is allocated based on the substitute tone generator mode RTM, and at a step S126, musical tone data based on the substitute tone generator mode RTM and substitute tone color number RTC are set to a tone generator register for the allocated channel, and a command to initiate tone generation is generated to produce and sound musical tone waveform data of the substitute tone color number RTC in the substitute tone generator mode RTM. Then, the processing of the note-on event is terminated.

Figure 17:
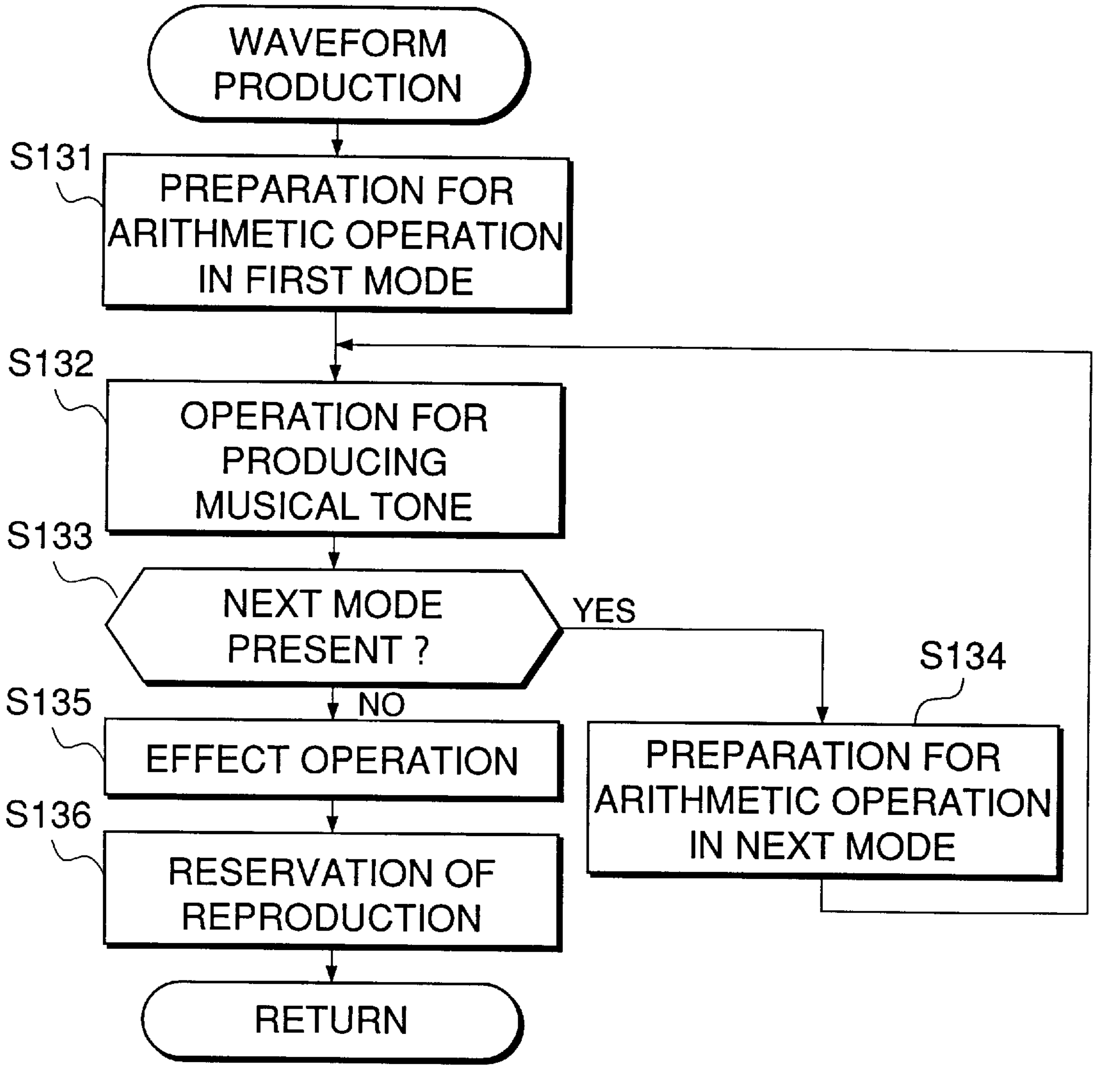
FIG. 17 is a flowchart showing in detail a waveform producing process in FIG. 5.

FIG. 17 shows in detail the waveform producing process of the step S6 of FIG. 5. In Fig. 17, a step S131 is initially executed to prepare for arithmetic operations for generating a musical tone in the first tone generator mode. A step S132 is then executed to perform arithmetic operations for generating musical tones through a plurality of channels in the currently selected tone generator mode, and a step S133 is executed to determine whether any operation for generating a musical tone is to be performed in the next tone generator mode. In the presence of a musical tone-generating operation to be performed in the next tone generator mode, a step S134 is executed to prepare for the musical tone-generating operation in the next tone generator mode, and the program returns to the step S132.

If the step S133 determines that there is no operation for computing the musical tone waveform to be performed in the next tone generator mode, on the other hand, a step S135 is executed to perform an effect operation with respect to one frame of the musical tone waveform data produced at the step S132. Then, the one frame of musical tone waveform data is reserved for reproduction in the DMAC at a step S136, followed by terminating the present waveform producing process.

Figure 18:
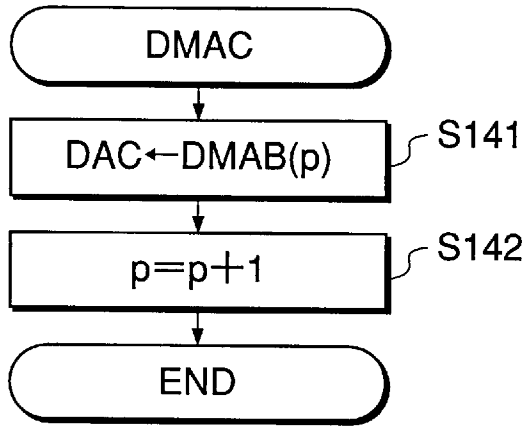
FIG. 18 is a flowchart showing a DMAC process performed by a DMAC appearing in FIG. 1.

FIG. 18 shows a DMAC process carried out by the DMAC 12. The present process is initiated in response to the sample request interrupt signal (hardware interrupt signal) generated by the sound I/O 10 at time intervals corresponding to the repetition period of the sampling signal transmitted from the sampling frequency generator 11 to the sound I/O 10.

At a step S141 of FIG. 18, one sample of musical tone waveform data located at the position designated by the pointer p in the musical tone waveform buffer DMAB is transferred to a buffer (the above-indicated input FIFO memory) of the sound I/O 10. Then, the point p is incremented by "1" at a step S142, followed by the present DMAC process being terminated.

As explained above, in the present embodiment, if a tone color switch event occurs, and tone color data to which the current tone color data is switched or changed is stored in the tone generator data storage region, tone generation according to the selected tone color data is immediately conducted. If the tone color data to which the current data is switched is not stored in the tone generator data storage region, on the other hand, a command is generated to read out the selected tone color data from the hard disc device 7, and store the data in the tone generator data storage region, while generating a musical tone according to other tone color data similar to the selected tone color data. Thus, only necessary tone color data are developed on the RAM in accordance with occurrence of the tone color switch event, whereby the percentage of the RAM occupied by the tone color data can be reduced to the minimum. Accordingly, other application programs may be executed at the same time, assuring high efficiency in the operations of these application programs.

While MIDI events occur during reproduction of music data in the illustrated embodiment, the present invention is not limited to this arrangement, but MIDI events may occur according to MIDI data received from an external keyboard, sequencer or the like, through a MIDI interface, for example. In such cases, the "occurrence of MIDI event" in Fig.5 corresponds to the time when the MIDI event is received. The present invention is particularly more effective in the case of receiving MIDI data in which the next MIDI event is not predictable, than in the case of reproducing music data as explained in the present embodiment (in some cases, the music data can be read in advance).

In the illustrated embodiment, where desired mode data and tone color data are not stored in the tone generator data storage region, these data are read out from the hard disc device 7 and loaded. The present invention is not limited to this arrangement, but the desired mode data and tone color data may be read out from an external storage medium inserted in the drive device 8 of FIG. 1 and loaded in the storage region, or may be read out from the server computer 102 through the network I/O 9 and communication network 101. Further, where data to be loaded are not stored in the hard disc device 7, the data may be searched through other media.

In the present embodiment, where a similar tone color is not present in the tone color data (which are loaded in the tone generator data storage region) in the same tone generator mode as the tone generator mode TM, substitute tone generation is conducted using a similar tone color in the FM tone generator mode. The present invention, however, is not limited to this arrangement, but may be adapted such that the substitute tone generation is conducted, using 128 tone colors of the PCM tone generator mode of the above-indicated GM system as standard tone colors.

A method of processing music data and a method of reproducing the music data that have been processed according to one embodiment of the invention will be now described.

The music data-processing method and the processed music data-reproducing method according to the present embodiment may be carried out by a hardware (i.e., general-purpose computer) similar to that used in the musical tone-generating method of the above-described embodiment. Thus, the general-purpose computer as explained referring to FIG. 1 is used as the hardware for practicing the music data-processing and music data-reproducing methods of the present embodiment, and the construction of this computer will not be described herein.

In the following, the summary of control processes performed by the computer that employs the music data-processing method and processed music data-reproducing method of the present embodiment will be explained, and details of the control processes will be then explained.

The control processes carried out by the computer of the present embodiment are roughly classified into two type of processes, namely, a musical tone-generating process for producing musical tone waveform data and sounding the produced data, and preparation for the musical tone-generating process. The musical tone-generating process except a part of it is carried out according to a well-known method, and therefore the summary of this process will not be explained herein.

The preparation for the musical tone-generating process comprises three main processes as follows:

(1) Downloading of music data

This process is to download music data prepared in the SMF (Standard MIDI File) format (hereinafter referred to as "music data SMF") from the server computer 102 through the communication network 101. Where the mode data or tone color data used in the downloaded music data SMF are not stored in the hard disc drive 7, such mode data or tone color data are also downloaded from the server computer.

(2) Conversion of music data

The process is to analyze music data SMF downloaded as described above or music data SMF produced by the user, and pick up tone generator mode switch event data and tone color switch event data in the music data SMF. Before these event data are read out during reproduction of the music data, a load command event or events for loading tone color data designated by the switch event data in a corresponding region of the tone generator data storage region, and an unload command event or events for deleting (unloading) tone color data that will not be used in the music data SMF from the tone generator data storage region are inserted in appropriate positions in the music data SMF. Thus, the original music data SMF are converted into music data SMF', (3) Command to initiate reproduction of music data Where the music data SMF have been converted into the music data SMF' by the above-described music data converting process, a command to initiate reproduction of the converted music data SMF' is generated after tone generator data (mode data and tone color data) required for starting reproduction of the music data SMF' are loaded. Where the music data SMF have not been converted into the music data SMF', the same process as the music data converting process described above is carried out, and a command to initiate reproduction of the music data is generated after tone generator data required for reproduction of the music data are loaded.

As explained above referring to FIG. 4, the music data SMF consist of header data and sequence data. The header data include such data as the title of the song, amount of data, the date of production, and file format (SMF, GM and so on), and the sequence data include various kinds of MIDI event data, such as note-on/-off event data, control change event data, program change event data, bank select event data, and system exclusive event data, and timing data indicating the timing of occurrence of each MIDI event data. In the present embodiment in which musical tones may be produced in the same song in a maximum of three types of tone generator modes (FM tone generator mode, PCM tone generator mode, and physical model tone generator mode), as in the previous embodiment, the sequence data may include, as needed, mode switch event data for switching these three types of tone generator modes. Since the mode switch even data are currently not adopted as event data according to the MIDI standard, the system exclusive even data provide the mode switch event data as explained above with respect to the previous embodiment.

Referring to FIGS. 19–25, details of the above control processes performed by the computer of the present embodiment will be explained.

Figure 19:
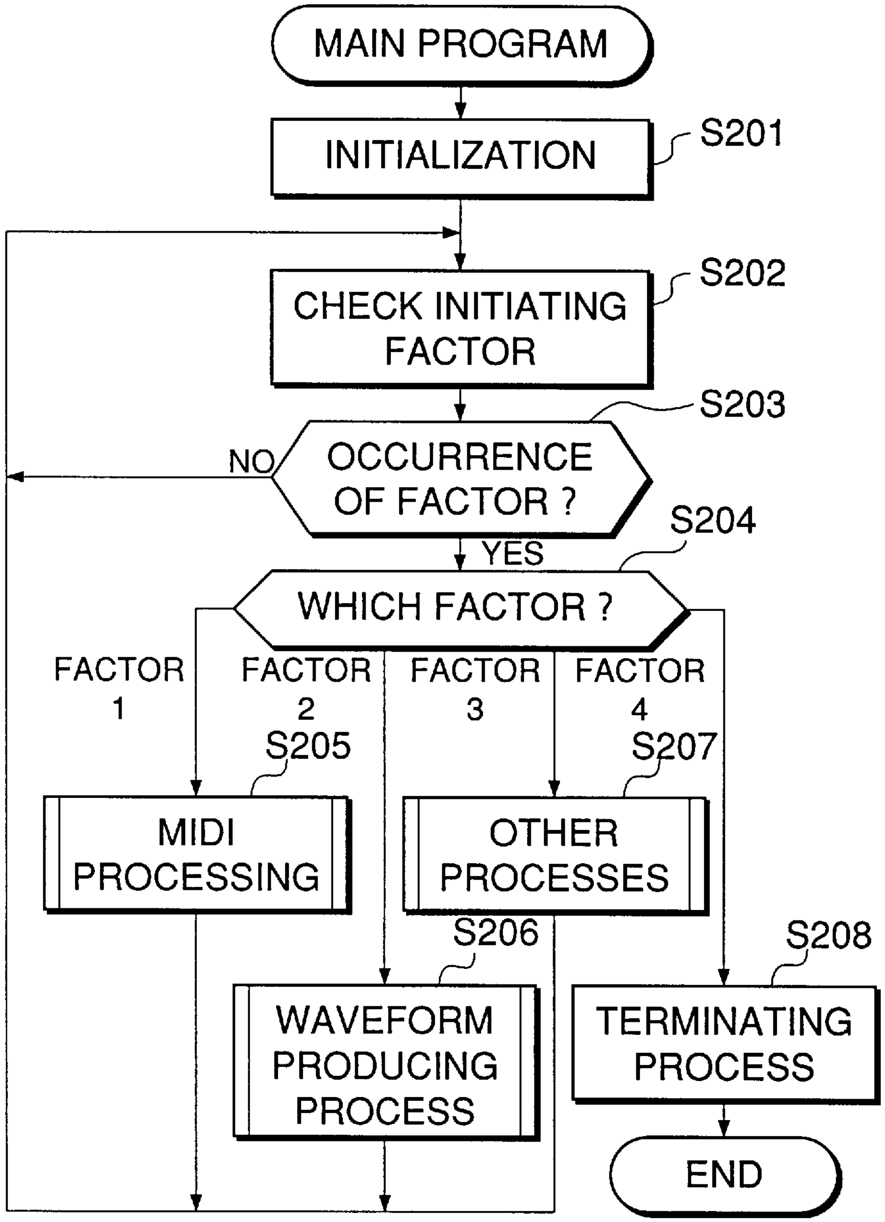
FIG. 19 is a flowchart showing a main program executed by CPU of a general-purpose computer to which music data processing method and processed music data reproducing method according to one embodiment of the present invention are applied.

FIG. 19 shows a main program executed by the computer, in particular the CPU 2, of the present embodiment. This program appears to be similar to the main program of FIG. 5, and thus will be not explained herein.

Figure 20:
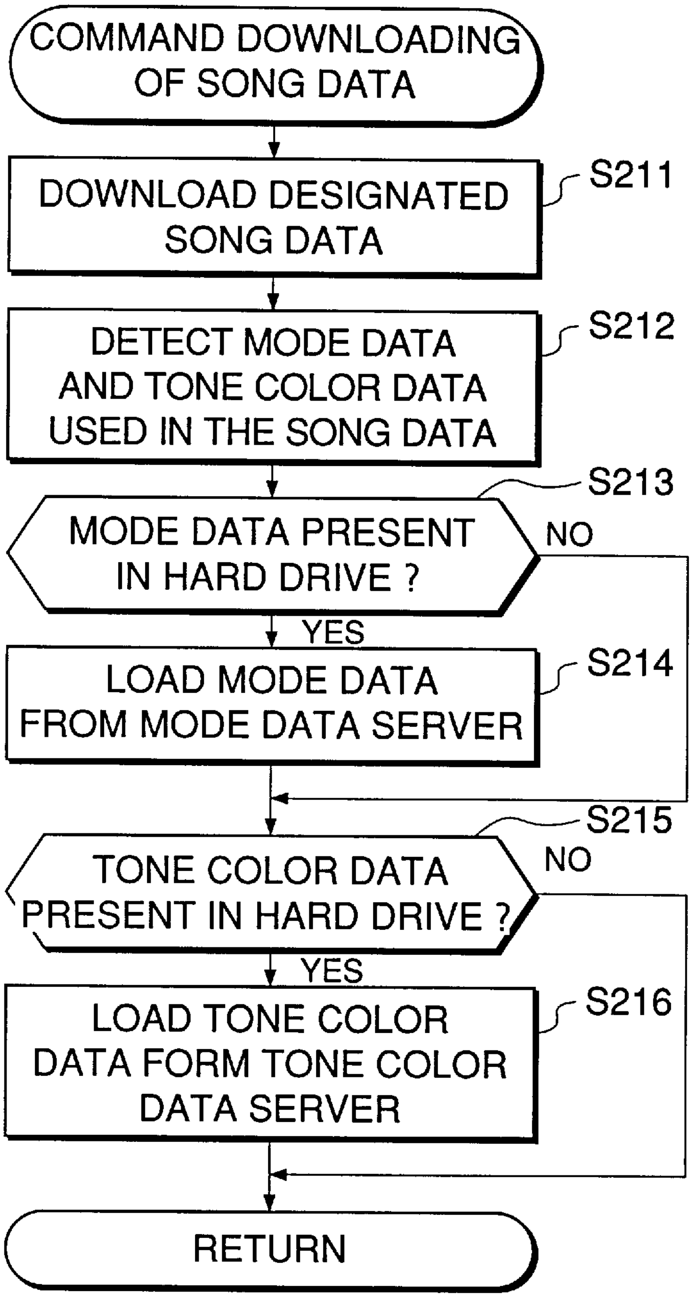
FIG. 20 is a flowchart showing a process of downloading music data.

FIG. 20 shows in detail the above-described process of downloading music data. This process is one of other processes of a step S207 of FIG. 19. For example, the present downloading process is initiated when the user clicks, with the mouse, a download button (icon) displayed on the display 6.

In the program of FIG. 20, a step S211 is initially executed to download music data designated by the user from the server computer 102 through the communication network 101. A step S212 is then executed to detect or search mode data and tone color data used in the music data SMF downloaded at the step S211. Since the mode data are determined by the mode switch event data in the present embodiment, the mode switch event data are searched so as to detect or determine the tone generator mode. On the other hand, since the tone color data are determined by three types of data, namely, designated tone generator mode, bank select event data and program change event data, the latter two types of data are searched to determine the tone color data, and the tone color number is detected based on the detected tone generator mode.

At the next step S213, it is determined whether or not the mode data detected at the step S212 are stored in the hard disc drive 7. If the mode data are not stored in the hard disc drive 7, the relevant mode data are downloaded from a mode data server (server computer 102) through the communication network 101. If the detected mode data are stored in the hard disc drive 7, on the other hand, a step S214 is skipped, and the program proceeds to a step S215.

At the step S215, it is determined whether or not the tone color data detected at the step S212 are stored in the hard disc drive 7. If the tone color data are not stored in the hard disc drive 7, a step 216 similar to the step S214 is executed to download the desired tone color data from a tone color data server (server computer 102) through the communication network 101, and then the present downloading process is terminated. If the desired tone color data are stored in the hard disc drive 7, on the other hand, the present downloading process is immediately terminated.

Figure 21:
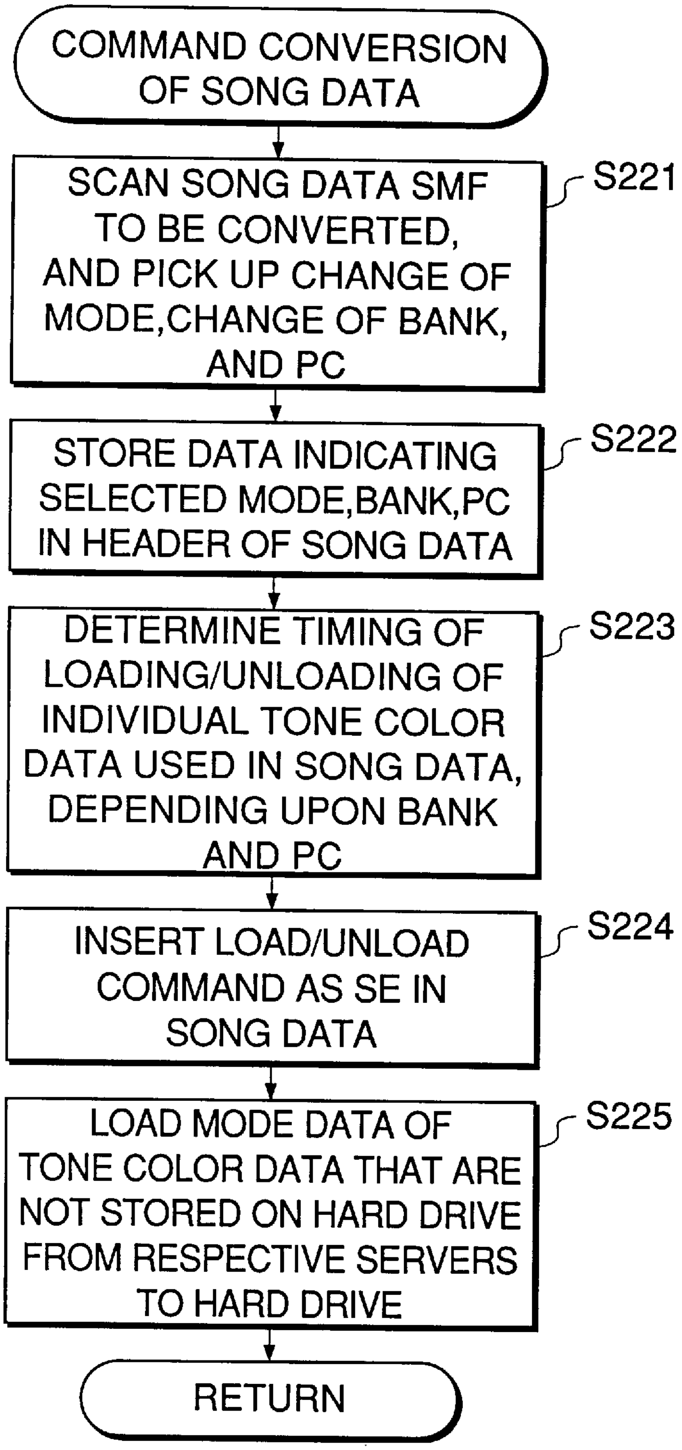
FIG. 21 is a flowchart showing a process of converting music data.

FIG. 21 shows in detail the above-described process of converting music data. This process is also one of other processes of the step S207 of FIG. 19, and is initiated when the user clicks, with the mouse, a music data conversion button (icon) displayed on the display 6, in the similar manner to the download process of FIG. 20.

In FIG. 21, a step S221 is initially executed to scan the music data SMF to be converted as instructed by the user, and pick up any mode switch event data (change of the mode), bank select event data (change of the bank) and program change event data (PC).

At the next step S222, the type of the tone generator mode designated by the mode switch event data thus picked up, and the tone color number of the tone color indicated by the bank select event data and program change event data (PC) are stored in the header of the music data SMF. In this connection, each set of the selected tone generator mode and corresponding tone color number is stored in the header such that the entire data thus picked up from the music data do not overlap with each other. In this manner, the mode data and tone color data used in the music data SMF may be known only by looking at the header, as shown in FIG. 4.

With the tone color (number) determined depending upon the bank and PC picked up at the step S221, a step S223 is executed to determine the timing of loading/unloading of individual tone color data used in the music data SMF, depending upon the thus determined tone color number. The timing is determined in the following manner.

1) Where the designated tone color data are not stored in the tone generator data storage region of FIG. 2, the timing of generating a command to load the tone color data is determined to be "x" seconds before the change of bank and PC. In this regard, "x" seconds is a time duration in which loading of the tone color data is completed, namely, a duration in which the tone color data are read out from the hard disc device 7 and loaded into the corresponding region of the tone generator storage region, and the number "x" of seconds is changed depending upon the amount of the tone color data. The number "x" of seconds may be a fixed value (fixed time duration in which the loading is completed no matter what tone color data are designated), irrespective of the type of the tone color data.

2) Where the tone color data stored in the tone generator data storage region are designated, it is needless to say that the timing of generating a command to load is not determined.

3) With regard to the tone color data that stop being used due to change of the bank and PC occurring in the music data SMF and will not be used in the music data after such change, the timing of unloading such tone color data is determined to be immediately after (or a certain time after) the change of the bank and PC. Where the amount of the tone color data stored in the tone generator data storage region becomes excessively large, however, a command to unload even the tone color data that will be used in the future (but not immediately used) is generated. Where a plurality of songs are to be successively reproduced (chain reproduction), the tone color data to be used in the songs to be played later may be retained in the tone generator data storage region if a free or empty region remains in the tone generator data storage region.

At a step S224, the load command or unload command is allocated as system exclusive event data (SE), and the system exclusive event data corresponding to the load/unload command thus determined are inserted in the music data SMF at the position of the timing determined at the step S223.

In the case where the mode data and tone color data that are not present in the hard disc device 7 are used, a step S225 is executed to download the desired data from the server computer 102, through the communication network 101, in the same manner as in the steps S213–216 of FIG. 20, and then the present music data converting process is terminated. In this manner, the converted music data SMF' are prepared by the present music data converting process.

Figure 22:
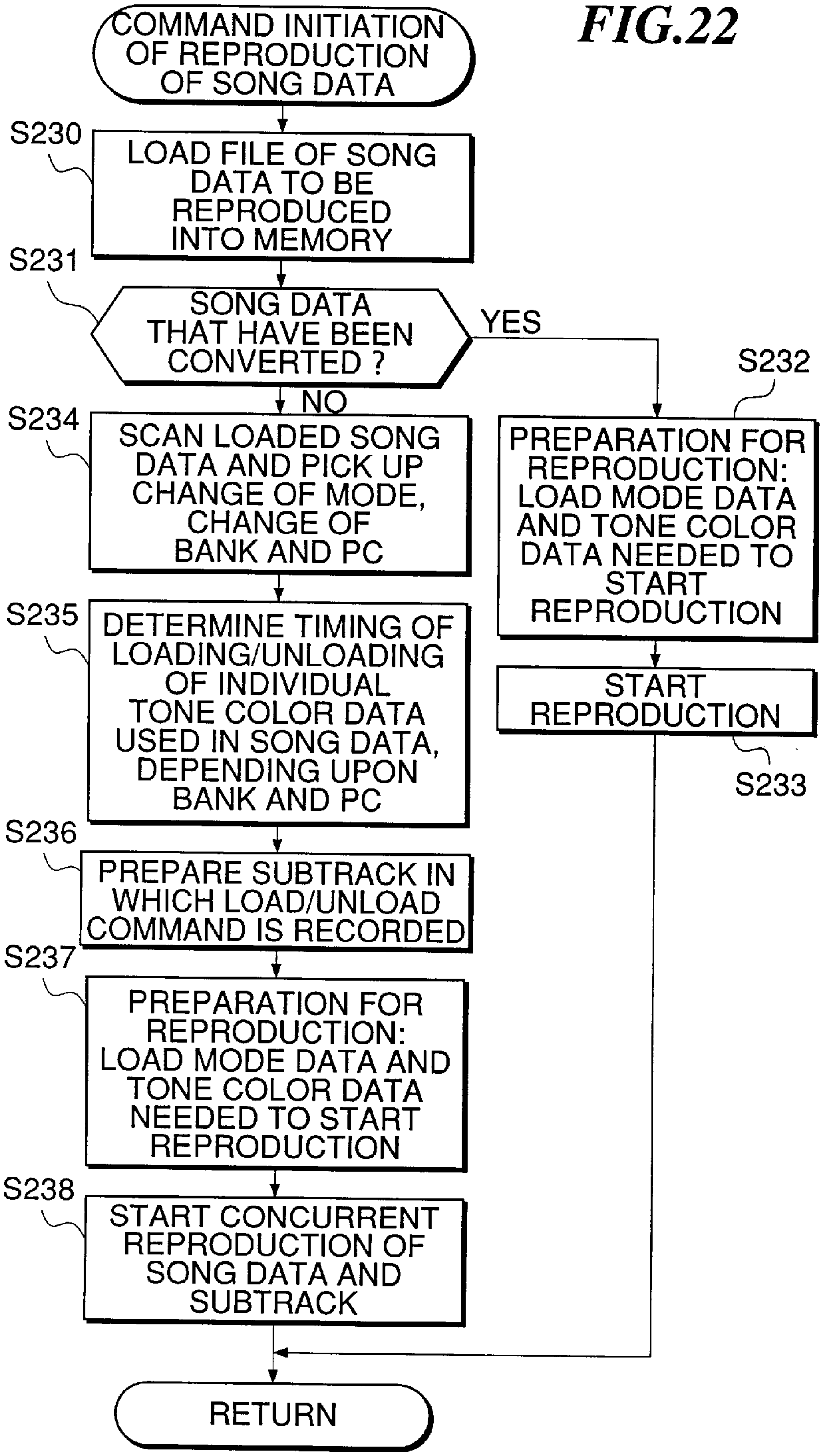
FIG. 22 is a flowchart showing a process of generating a command to initiate reproduction of music data.

FIG. 22 shows details of the above-described process of generating a command to initiate reproduction of music data. This process is also one process of other processes of the step S207 of FIG. 19, and is initiated when the user clicks, with the mouse, a music data reproduction start button (icon) displayed on the display 6, for example, in the similar manner to the download process of FIG. 20.

At a step S230 of FIG. 22, the file of the music data to be reproduced as instructed by the user is loaded in a reproduced music data storage region provided at a predetermined position of the RAM 4. A step S230 is then executed to determine whether or not the file loaded at the step S230 consists of the converted music data SMF'. If the loaded file consists of the converted music data SMF', a step S232 is executed to carry out a reproduction preparation process, namely, a process of loading mode data and tone color data required for initiating the reproduction of the music data. At this step, the mode data corresponding to all of the tone generator modes designated in the converted music data SMF' are loaded as the mode data. Then, a step S233 is executed to generate a command to initiate reproduction of the converted music data SMF', followed by the present process of initiating reproduction of the music data being terminated.

If the step S231 determines that the loaded file does not consist of the converted music data SMF', a step S234 is executed to scan the loaded music data, and pick up change of the mode, change of the bank and PC, in the same manner as in the step S221, and a step S225 is executed to determine the timing of loading/unloading of individual tone color data used in the music data SMF, depending upon the bank and PC, in the same manner as in the step S223. At a step S236, a sub track in which the command for loading/unloading is recorded is prepared at the position of the timing determined at the step S235.

At the next step S237, the preparation for reproduction is carried out in the same manner as in the step S232, and a step S238 is then executed to generate a command to initiate concurrent reproduction of the music data and the sub track produced at the step S236. Then, the present process of generating a command to reproduce the music data is terminated.

Figure 23:
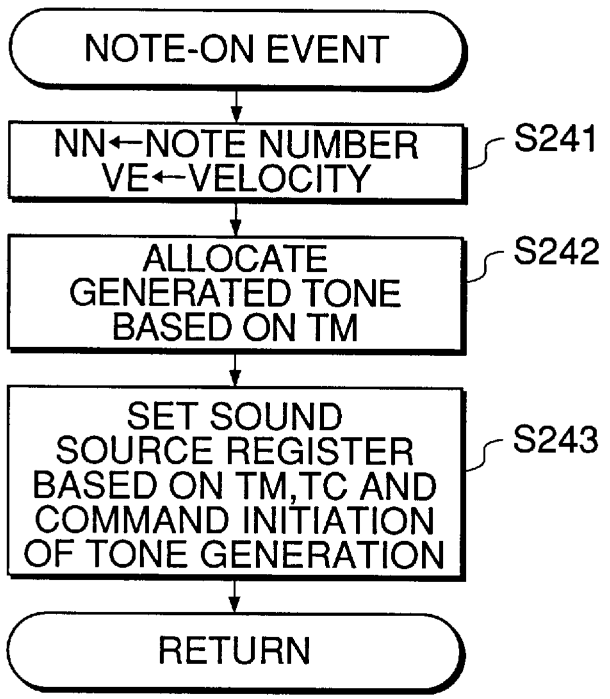
FIG. 23 is a flowchart showing a process of handling a note-on event.

FIG. 23 shows the procedure of handling or processing a note-on event. This process is one process of MIDI signal processing of the step S205 of FIG. 19, and is initiated upon occurrence of a note-on event as one type of the MIDI events.

In FIG. 23, a step S241 is initially executed to analyze note-on event data received by the above-indicated buffer, and store the note number of the note-on event data in a predetermined region NN of the RAM 4, while storing its velocity in a predetermined region VE of the RAM 4. A step S242 is then executed to allocate a channel to the musical tone to be generated based on the content of the region TM provided at a predetermined position of the RAM for storing the tone generator mode (hereinafter, the content will be called "tone generator mode TM"). As described above, the tone generator mode TM is determined by the mode switch event.

At the next step S243, musical data based on the tone generator mode TM and the content of the region TC is set to a tone generator register (not shown) for the channel to which the musical tone to be generated is allocated, the region TC being provided at a predetermined position of the RAM 4 for storing the tone color number (hereinafter, the content will be called "tone color number TC"), and a command for initiating tone generation is generated to produce and sound the musical tone waveform data of the tone color number TC in the tone generator mode TM. Then, the present process of handling the note-on event is terminated. As described above, the tone color number TC is determined by the bank select event data and program change event data.

Figure 24:
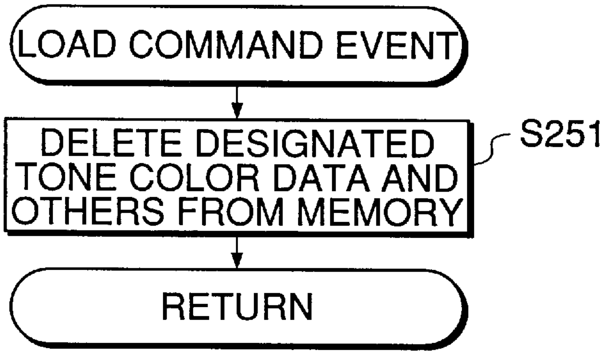
FIG. 24 is a flowchart showing a process of handling a load command event.

FIG. 24 shows the process of handling a load command event, which is one process of the MIDI signal processing of the step S205 of FIG. 19. The present process is initiated upon occurrence of a load command event inserted in the music data at the step S224 of FIG. 21 (or step S236 of FIG. 22). Before the loading process is carried out, it is confirmed whether the tone color data and others that are designated to be loaded are stored in the tone generator data storage region, and the loading is not conducted if the designated data are already stored.

In FIG. 24, the designated tone color data and others are loaded from the hard disc drive 7 into the corresponding region of the tone generator storage region at a step S251, and then the present process of handling a load command event is terminated.

Figure 25:
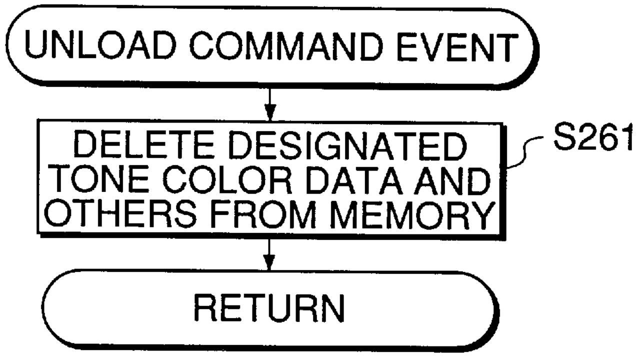
FIG. 25 is a flowchart showing a process of handling an unload command event.

FIG. 25 shows the process of handling an unload command event, which is one process of the MIDI signal processing of the step S205 of FIG. 19. The present process is initiated upon occurrence of an unload command event inserted in the music data at the step S224 of FIG. 21 (or step S236 of FIG. 22).

In FIG. 25, the designated tone color data and others are deleted from the corresponding region of the tone generator data storage region at a step S261, and then the present process of handling a unload command event is terminated.

Referring back to FIG. 19, the computer of the present invention executes a step S206 to perform a similar process to the waveform-producing process as explained above referring to FIG. 17, and, if reproduction of the musical tone waveform data is reserved in this waveform producing process, the DMAC 12 performs a similar process to the DMAC process as explained above referring to FIG. 18.

In the present embodiment, as described above, music data are analyzed prior to reproduction of the music data, so as to detect the position of change of the tone color (program change, for example) in advance, and, during reproduction of the music data, a load command event is generated so that tone color data required for the change of the tone color are loaded in the RAM a certain time before the tone color change. Where the tone color data used before the change of the tone color will not be used in the future (or will not be used for more than a predetermined time), the unnecessary tone color data are eliminated from the RAM at the point of the change of the tone color. Thus, only necessary tone color data are developed on the RAM as the music data are reproduced, whereby the percentage of the RAM occupied by the tone color data can be reduced to the minimum. Accordingly, other application programs may be executed at the same time, assuring high efficiency in the operations of these application programs.

In this connection, where the designated tone generator mode is only the FM tone generator mode, the amount of the tone generator data to be loaded in the tone generator data storage region in the RAM 4 is about 70 kilobytes (KB). Where the designated tone generator modes include the FM tone generator mode and the PCM tone generator mode, the amount of the tone generator data to be loaded is about 500 kilobytes (KB). Where the designated tone generator modes include the FM tone generator mode, PCM tone generator mode and the physical model tone generator mode, the amount of the tone generator data to be loaded is about 600 kilobytes (KB). Thus, the amount of the loaded tone generator data is significantly reduced, as compared with 2 megabytes (MB) when the conventional PCM tone generator mode is employed.

Since the load/unload command events are inserted in the music data prior to reproduction of the music data, the load on the CPU during reproduction of the music data can be reduced.

In the present embodiment, the timing of loading/unloading is prepared prior to the reproduction of the music data, and therefore the load on the CPU during the reproduction can be reduced. For example, the present invention may be advantageously applied to the case where songs to be reproduced are used as BGM for a game or the like, since the music data are preliminarily determined for the game or the like, and thus the timing can be inserted in advance in the music data.

Since the load/unload command events are inserted as system exclusive event data in the present embodiment, the music data that have been processed may be reproduced by a normal sequencer in the same manner in which the music data that have not been processed are reproduced. This is because the system exclusive event data which cannot be interpreted by an electronic instrument of MIDI standard are ignored.

While the load/unload command event data are prepared before reproduction of music data in the illustrated embodiment, the present invention is not limited to this arrangement, but data located after the reproduced position may be read in advance during reproduction of the music data, and, if there is any tone color switch event, a load command event may be generated a certain time before the tone color switch event. In this manner, the musical tone generation according to the present invention can be achieved even where only a portion of the music data is received or prepared. For example, the load/unload command event may be inserted into music data while receiving the music data through a network.

It is also possible to deliver, through a network, music data in which load/unload command events are preliminarily inserted according to the music data-processing method of the present embodiment.

While the tone color data stored in the tone generator data storage region are deleted (unloaded) with respect to each song, the present invention is not limited to this arrangement, but the tone color data may be deleted if they are not used for a long time (e.g., 10 minutes or longer).

The object of the present invention may be accomplished by providing a storage medium in which a software program having the functions of the above-described embodiment is recorded, in a system or apparatus, and causing a computer (CPU 2 or MPU) of the system or apparatus to read out and execute the program stored in the storage medium.

In this case, the program itself read out from the storage medium achieves the novel functions of the present invention, and the storage medium storing the program constitutes or provides the present invention.

The storage medium for supplying the program to the system or apparatus may be in the form of the hard disc as described above, CD-ROM, MO, MD, floppy disc, CD-R (CD-Recordable), magnetic tape, nonvolatile memory card, or ROM 3, for example. Also, the program may be supplied from other MIDI equipment or the server computer 102 through the communication network 101.

The functions of the illustrated embodiment may be accomplished not only by executing the program read out by the computer, but also by causing an OS operating on the computer to perform a part of or all of actual operations according to the instructions of the program.

Further, the program read out from the storage medium may be written in a memory provided in an expanded function board inserted in the computer, or an expanded function unit connected to the computer, and the CPU 2 or the like provided in the expanded function board or expanded function unit may actually perform a part of or all of the operations, based on the instructions of the program, so as to accomplish the functions of the illustrated embodiment.

What is claimed is:

1. A method of generating musical tones, comprising the steps of:

storing tone color data in tone color data storage means;

searching said tone color data storage means upon occurrence of performance information indicative of a change of tone color, to determine whether tone color data selected by the change of tone color are stored in said tone color data storage means; and controlling musical tone generation such that when a result of said searching indicates that the tone color data selected by the change of tone color are stored in said tone color data storage means, a musical tone is generated based on said tone color data, and, when the tone color data selected by the change of tone color are not stored in said tone color data storage means, the tone color data are read out from a storage medium storing the selected tone color data, and transferred to and stored in said tone color data storage means, while generating a musical tone based on other tone color data similar to the selected tone color data.

2. A method of generating musical tones according to claim 1, further comprising the step of deleting tone color data that become unnecessary, out of the tone color data stored in said tone color data storage means, under a predetermined condition.

3. A method of generating musical tones according to claim 2, wherein said predetermined condition is that if any tone color has not been used until said step of deleting is executed, tone color data representing the tone color are deleted.

4. A method of generating musical tones according to claim 2, wherein said predetermined condition is that if an amount of tone color data stored in said tone color data storage means is not smaller than a predetermined amount, tone color data that have been stored for the longest time are deleted.

5. A method of processing music data, comprising the steps of:

storing music data in storage means;

picking up a tone color selection event included in the music data stored in said storage means; and inserting a load command event for generating a command to load tone color data selected by said tone color selection event, at a position in the stored music data which is located a predetermined time period before a position at which said tone color selection event is picked up.

6. A method of processing music data according to claim 5, further comprising the step of inserting an unload command event for generating a command to unload said tone color data selected just before occurrence of said tone color selection event when detecting that the tone color data selected just before occurrence of said tone color selection event will not be selected after the tone color selection event.

7. A method of reproducing music data, comprising the steps of:

supplying music data including event data and timing data indicative of the timing of occurrence of the event data;

picking up a tone color selection event included in said music data, prior to reproduction of the supplied music data;

reproducing said music data by successively reading out respective data of the supplied music data, so that an event designated by a corresponding one of said event data occurs in the timing designated by said timing data;

generating a load command event to generate a command to load said tone color data, prior to occurrence of said tone color selection event, during reproduction of the supplied music data;

transferring said tone color data from second storage means in which tone color data selected by said tone color selection event are stored to first storage means to store the selected tone color data therein, in response to said command to load the tone color data; and generating a musical tone in response to occurrence of said event, using the tone color data stored in said first storage means.

8. A method of reproducing music data according to claim 7, further comprising the steps of:

generating an unload command event to generate a command to unload tone color data that will not be used, during reproduction of the supplied music data, and deleting the selected tone color data from said first storage means, in response to said command to unload the tone color data.

9. An apparatus for generating musical tones, comprising:

a tone color storage device that stores tone color data;

a search device that searches said tone color data storage device upon occurrence of performance information indicative of a change of tone color, to determine whether tone color data selected by the change of tone color are stored in said tone color data storage device; and a control device that controls musical tone generation such that when a result of said searching indicates that the tone color data selected by the change of tone color are stored in said tone color data storage device, a musical tone is generated based on said tone color data, and, when the tone color data selected by the change of tone color are not stored in said tone color data storage device, the tone color data are read out from a storage medium storing the selected tone color data, and transferred to and stored in said tone color data storage device, while generating a musical tone based on other tone color data similar to the selected tone color data.

10. An apparatus for generating musical tones according to claim 9, further comprising a device that deletes tone color data that become unnecessary, out of the tone color data stored in said tone color data storage device, under a predetermined condition.

11. An apparatus for generating musical tones according to claim 10, wherein said predetermined condition is that if any tone color has not been used until said deleting is executed, tone color data representing the tone color are deleted.

12. An apparatus for generating musical tones according to claim 10, wherein said predetermined condition is that if an amount of tone color data stored in said tone color data storage device is not smaller than a predetermined amount, tone color data that have been stored for the longest time are deleted.

13. An apparatus for processing music data, comprising:

a musical data storage device that stores storing music data;

a pickup device that picks up a tone color selection event included in the music data stored in said storage device; and a load command event insertion device that inserts a load command event for generating a command to load tone color data selected by said tone color selection event, at a position in the stored music data which is located a predetermined time period before a position at which said tone color selection event is picked up.

14. An apparatus for processing music data according to claim 13, further comprising an unload command insertion device that inserts an unload command event for generating a command to unload said tone color data selected just before occurrence of said tone color selection event when detecting that the tone color data selected just before occurrence of said tone color selection event will not be selected after the tone color selection event.

15. An apparatus for reproducing music data, comprising:

a supply device that supplies music data including event data and timing data indicative of the timing of occurrence of the event data;

a pickup device that picks up a tone color selection event included in said music data, prior to reproduction of the supplied music data;

a reproduction device that reproduces said music data by successively reading out respective data of the supplied music data, so that an event designated by a corresponding one of said event data occurs in the timing designated by said timing data;

a load command event generation device that generates a load command event to generate a command to load said tone color data, prior to occurrence of said tone color selection event, during reproduction of the supplied music data;

a transfer device that transfers said tone color data from a second storage device in which tone color data selected by said tone color selection event are stored to a first storage device to store the selected tone color data therein, in response to said command to load the tone color data; and a musical tone generation device that generates a musical tone in response to occurrence of said event, using the tone color data stored in said first storage device.

16. An apparatus for reproducing music data according to claim 15, further comprising:

an unload command generation device that generates an unload command event to generate a command to unload tone color data that will not be used, during reproduction of the supplied music data, and a deletion device that deletes the selected tone color data from said first storage device, in response to said command to unload the tone color data.

17. A storage medium according to claim 15, further comprising:

an unload command generation module that generates an unload command event to generate a command to unload tone color data that will not be used, during reproduction of the supplied music data, and a deletion module that deletes the designated tone color data from said first storage means, in response to said command unload the tone color data.

18. A storage medium that stores a program which can be carried out by a computer, comprising:

a storage module that stores tone color data in tone color data storage means;

a search module that searches said tone color data storage means upon occurrence of performance information indicative of a change of tone color, to determine whether tone color data selected by the change of tone color are stored in said tone color data storage means; and a control module that controls musical tone generation such that when a result of searching indicates that the tone color data selected by the change of tone color are stored in said tone color data storage means, a musical tone is generated based on said tone color data, and, when the tone color data selected by the change of tone color are not stored in said tone color data storage means, the tone color data are read out from a storage medium storing the selected tone color data, and transferred to and stored in said tone color data storage means, while generating a musical tone based on other tone color data similar to the selected tone color data.

19. A storage medium according to claim 18, further comprising a module that deletes tone color data that become unnecessary, out of the tone color data stored in said tone color data storage means, under a predetermined condition.

20. A storage medium according to claim 19, wherein said predetermined condition is that if any tone color has not been used until said step of deleting is executed, tone color data representing the tone color are deleted.

21. A storage medium according to claim 19, wherein said predetermined condition is that if an amount of tone color data stored in said tone color data storage means is not smaller than a predetermined amount, tone color data that have been stored for the longest time are deleted.

22. A storage medium that stores a program that can be carried out by a computer, comprising:

a storage module that stores music data in storage means;

a pickup module that picks up a tone color selection event included in the music data stored in said storage means; and a load command event insertion module that inserts a load command event for generating a command to load tone color data selected by said tone color selection event, at a position in the stored music data which is located a given time period before a position at which said tone color selection event is picked up.

23. A storage medium according to claim 22, further comprising a module that inserts an unload command event for generating a command to unload said tone color data selected just before occurrence of said tone color selection event when detecting that the tone color data selected just before occurrence of said tone color selection event will not be selected after the tone color selection event.

24. A storage medium that stores a program that can be carried out by a computer, comprising:

a supply module that supplies music data including event data and timing data indicative of the timing of occurrence of the event data;

a pickup module that picks up a tone color selection event included in said music data, prior to reproduction of the supplied music data;

a reproduction module that reproduces said music data by successively reading out respective data of the supplied music data, so that an event designated by a corresponding one of said event data occurs in the timing designated by said timing data;

a load command event generation module that generates a load command event to generate a command to load said tone color data, prior to occurrence of said tone color selection event, during reproduction of the supplied music data;

a transfer module that transfers said tone color data from second storage means in which tone color data selected by said tone color selection event are stored to first storage means to store the selected tone color data therein, in response to said command to load the tone color data; and a musical tone generation module that generates a musical tone in response to occurrence of said event, using the tone color data stored in said first storage.

* * * * *